US011627596B2

(12) United States Patent
Fakoorian et al.

(10) Patent No.: US 11,627,596 B2
(45) Date of Patent: Apr. 11, 2023

(54) JOINT SHARED CHANNEL FREQUENCY ALLOCATION IN DOWNLINK CONTROL INFORMATION

(71) Applicant: QUALCOMM Incorporated, San Diego, CA (US)

(72) Inventors: Seyed Ali Akbar Fakoorian, San Diego, CA (US); Wei Yang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/222,711

(22) Filed: Apr. 5, 2021

(65) Prior Publication Data

US 2021/0360676 A1    Nov. 18, 2021

Related U.S. Application Data

(60) Provisional application No. 63/023,792, filed on May 12, 2020.

(51) Int. Cl.
*H04W 72/12* (2009.01)
*H04W 72/04* (2009.01)
(Continued)

(52) U.S. Cl.
CPC ... *H04W 72/1289* (2013.01); *H04W 72/0453* (2013.01); *H04W 72/1257* (2013.01); *H04W 72/1273* (2013.01)

(58) Field of Classification Search
CPC ......... H04W 72/1289; H04W 72/1273; H04W 72/0453; H04W 72/1257; H04W 48/12; H04W 72/1278
See application file for complete search history.

(56) References Cited

U.S. PATENT DOCUMENTS

2020/0245314 A1* 7/2020 Hwang ............... H04L 5/0094
2021/0167930 A1* 6/2021 Jeon .................. H04W 72/042
2022/0345260 A1* 10/2022 Zhang ................ H04L 5/0044

FOREIGN PATENT DOCUMENTS

CN       109788560 A   *   5/2019
WO   WO-2018232284 A1     12/2018

OTHER PUBLICATIONS

CATT: "On PDSCH and PUSCH Resource Allocation", 3GPP Draft, R1-1800257, 3GPP TSG RAN WG1 Meeting AH 1801, vol. RAN WG1. No. Vancouver, Canada, Jan. 13, 2018 (Jan. 13, 2018), pp. 1-22, XP051384735, 22 Pages, Retrieved from the Internet: URL: http://www.3gpp.org/ftp/tsg%5Fran/WG1%5FRL1/TSGR1%5FAH/NR%5FAH%5F1801/Docs/Sec.2.1.3 Sec. 6 .1. 2. 2.
(Continued)

*Primary Examiner* — Romani Ohri
(74) *Attorney, Agent, or Firm* — Holland & Hart LLP

(57) ABSTRACT

Methods, systems, and devices for wireless communications are described. A user equipment (UE) may receive, from a base station, a control message that comprises scheduling information for a downlink message to be received by the UE and an uplink message to be transmitted by the UE. The UE may determine first frequency information for the downlink message and second frequency information for the uplink message based at least in part on the scheduling information, a first bitfield size associated with resource allocation for a first bandwidth part associated with the downlink message, and a second bitfield size associated with resource allocation for a second bandwidth part width associated with the uplink message. The UE may communicate the uplink message and the downlink message with the base station according to the first frequency information and the second frequency information.

49 Claims, 11 Drawing Sheets

(51) Int. Cl.
*H04W 72/0453* (2023.01)
*H04W 72/1273* (2023.01)

(56) References Cited

OTHER PUBLICATIONS

International Search Report and Written Opinion—PCT/US2021/026036—ISA/EPO—Jul. 22, 2021 (204147WO).

* cited by examiner

JOINT SHARED CHANNEL FREQUENCY ALLOCATION IN DOWNLINK CONTROL INFORMATION

CROSS REFERENCE

The present Application for Patent claims the benefit of U.S. Provisional Patent Application No. 63/023,792 by FAKOORIAN et al., entitled "SHARED CHANNEL FREQUENCY ALLOCATION IN DOWNLINK CONTROL INFORMATION," filed May 12, 2020, assigned to the assignee hereof, and expressly incorporated by reference herein.

FIELD OF TECHNOLOGY

The following relates generally to wireless communications and more specifically to joint shared channel frequency allocation in downlink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications system may support communications between a base station and a UE. A base station may transmit downlink control information (DCI) to schedule such communications. For example, the base station may schedule uplink communications and downlink communications in separate downlink control channel messages. However, such scheduling may be relatively inefficient, and may lead to increased signaling overhead and decoding complexity at the UE.

SUMMARY

The described techniques relate to improved methods, systems, devices, and apparatuses that support joint shared channel frequency allocation in downlink control information (DCI). A base station and a user equipment (UE) may communicate using one or more bandwidth parts (BWPs), for example, of a component carrier in a wireless communications system. In some examples, the wireless communications system may support sub-band full duplex (SBFD) communications between the base station and the UE (e.g., communications implementing one or both of a time division duplexing (TDD) mode and a frequency division duplexing (FDD) mode). The base station may schedule uplink communications and downlink communications in separate downlink control channel messages. However, such scheduling may be relatively inefficient, and may lead to increased signaling overhead and decoding complexity at the UE. The techniques described herein may provide for a joint DCI message scheduling both uplink communications and downlink communications (e.g., DCI indicating joint shared channel resource allocations in one or more sub-bands of an unpaired spectrum in an FDD mode and/or a TDD mode). For example, the base station may transmit a frequency domain resource allocation (FDRA) indication in a single DCI message that indicates both uplink frequency information and downlink frequency information. A UE may be configured to identify one or more uplink frequency BWPs and one or more downlink frequency BWPs for communications, for example, in a SBFD operation mode based on the DCI message (e.g., a set of bits of the FDRA indication), one or more bitfield sizes, one or more BWP sizes, or any combination thereof. Such a joint DCI message may result in reduced signaling overhead and decoding complexity in the system, among other benefits.

A method of wireless communications at a UE is described. The method may include receiving, from a base station, a control message that includes scheduling information for a downlink message to be received by the UE and an uplink message to be transmitted by the UE, determining first frequency information for the downlink message and second frequency information for the uplink message based on the scheduling information and a comparison between a first bitfield size associated with resource allocation for a first BWP associated with the downlink message and a second bitfield size associated with resource allocation for a second BWP associated with the uplink message, and communicating the uplink message and the downlink message with the base station according to the first frequency information and the second frequency information.

An apparatus for wireless communications at a UE is described. The apparatus may include a processor, memory coupled with the processor, and instructions stored in the memory. The instructions may be executable by the processor to cause the apparatus to receive, from a base station, a control message that includes scheduling information for a downlink message to be received by the UE and an uplink message to be transmitted by the UE, determine first frequency information for the downlink message and second frequency information for the uplink message based on the scheduling information and a comparison between a first bitfield size associated with resource allocation for a first BWP associated with the downlink message and a second bitfield size associated with resource allocation for a second BWP associated with the uplink message, and communicate the uplink message and the downlink message with the base station according to the first frequency information and the second frequency information.

Another apparatus for wireless communications at a UE is described. The apparatus may include means for receiving, from a base station, a control message that includes scheduling information for a downlink message to be received by the UE and an uplink message to be transmitted by the UE, determining first frequency information for the downlink message and second frequency information for the uplink message based on the scheduling information and a comparison between a first bitfield size associated with resource allocation for a first BWP associated with the downlink message and a second bitfield size associated with resource allocation for a second BWP associated with the uplink message, and communicating the uplink message and the downlink message with the base station according to the first frequency information and the second frequency information.

A non-transitory computer-readable medium storing code for wireless communications at a UE is described. The code may include instructions executable by a processor to receive, from a base station, a control message that includes scheduling information for a downlink message to be received by the UE and an uplink message to be transmitted by the UE, determine first frequency information for the downlink message and second frequency information for the uplink message based on the scheduling information and a comparison between a first bitfield size associated with resource allocation for a first BWP associated with the downlink message and a second bitfield size associated with resource allocation for a second BWP associated with the uplink message, and communicate the uplink message and the downlink message with the base station according to the first frequency information and the second frequency information.

In some examples of the method, apparatuses, and non-transitory computer-readable medium described herein, determining the first frequency information and the second frequency information may include operations, features, means, or instructions for determining the first frequency information for the downlink message from a set of bits of the scheduling information based on a result of the comparison, determining a scaling factor based on a first size of the first BWP associated with the downlink message and a second size of the second BWP associated with the uplink message, and determining the second frequency information for the uplink message based on the first frequency information and the scaling factor.

In some examples of the method, apparatuses, and non-transitory computer-readable medium described herein, determining the first frequency information from the set of bits may be based on the first size being greater than the second size.

In some examples of the method, apparatuses, and non-transitory computer-readable medium described herein, determining the first frequency information from the set of bits may be based on the first size being smaller than the second size.

In some examples of the method, apparatuses, and non-transitory computer-readable medium described herein, determining the first frequency information and the second frequency information may include operations, features, means, or instructions for determining the second frequency information for the uplink message from a set of bits of the scheduling information based on a result of the comparison, determining a scaling factor based on a first size of the first BWP associated with the downlink message and a second size of the second BWP associated with the uplink message, and determining the first frequency information for the downlink message based on the second frequency information and the scaling factor.

In some examples of the method, apparatuses, and non-transitory computer-readable medium described herein, determining the second frequency information from the set of bits may be based on the second size being greater than the first size.

In some examples of the method, apparatuses, and non-transitory computer-readable medium described herein, determining the second frequency information from the set of bits may be based on the second size being smaller than the first size.

In some examples of the method, apparatuses, and non-transitory computer-readable medium described herein, determining the first frequency information and the second frequency information may include operations, features, means, or instructions for determining a first resource allocation for one of the uplink message or the downlink message based on a set of bits of the scheduling information, and determining a second resource allocation for the other of the uplink message or the downlink message based on a subset of the set of bits.

Some examples of the method, apparatuses, and non-transitory computer-readable medium described herein may further include operations, features, means, or instructions for determining a quantity of most significant bits or a quantity of least significant bits based on a first size of the first BWP associated with the downlink message, a second size of the second BWP associated with the uplink message, a first resource assignment type for the downlink message, and a second resource assignment type for the uplink message, where the subset of the set of bits includes the quantity of the most significant bits or the quantity of the least significant bits.

In some examples of the method, apparatuses, and non-transitory computer-readable medium described herein, the first resource assignment type and the second resource assignment type may be a same resource assignment type.

In some examples of the method, apparatuses, and non-transitory computer-readable medium described herein, the first resource assignment type and the second resource assignment type may be different.

In some examples of the method, apparatuses, and non-transitory computer-readable medium described herein, determining the first frequency information and the second frequency information may include operations, features, means, or instructions for determining a first resource allocation for one of the uplink message or the downlink message based on a first subset of bits of the scheduling information, and determining a second resource allocation for the other of the uplink message or the downlink message based on a second subset of bits of the scheduling information.

Some examples of the method, apparatuses, and non-transitory computer-readable medium described herein may further include operations, features, means, or instructions for determining a quantity of most significant bits or a quantity of least significant bits included in the first subset of bits based on a first size of the first BWP associated with the downlink message and a second size of the second BWP associated with the uplink message.

In some examples of the method, apparatuses, and non-transitory computer-readable medium described herein, determining the second resource allocation may include operations, features, means, or instructions for determining one or more adjustment factors based on the second subset of bits, and determining the second resource allocation based on the first resource allocation and the one or more adjustment factors.

In some examples of the method, apparatuses, and non-transitory computer-readable medium described herein, determining the one or more adjustment factors may include operations, features, means, or instructions for selecting at least one of the one or more adjustment factors from a set of configured adjustment factors based on the second subset of bits.

In some examples of the method, apparatuses, and non-transitory computer-readable medium described herein, communicating the uplink message and the downlink message with the base station according to the first frequency information and the second frequency information may include operations, features, means, or instructions for communicating the uplink message and the downlink message via a single carrier.

DETAILED DESCRIPTION

Figure 1:
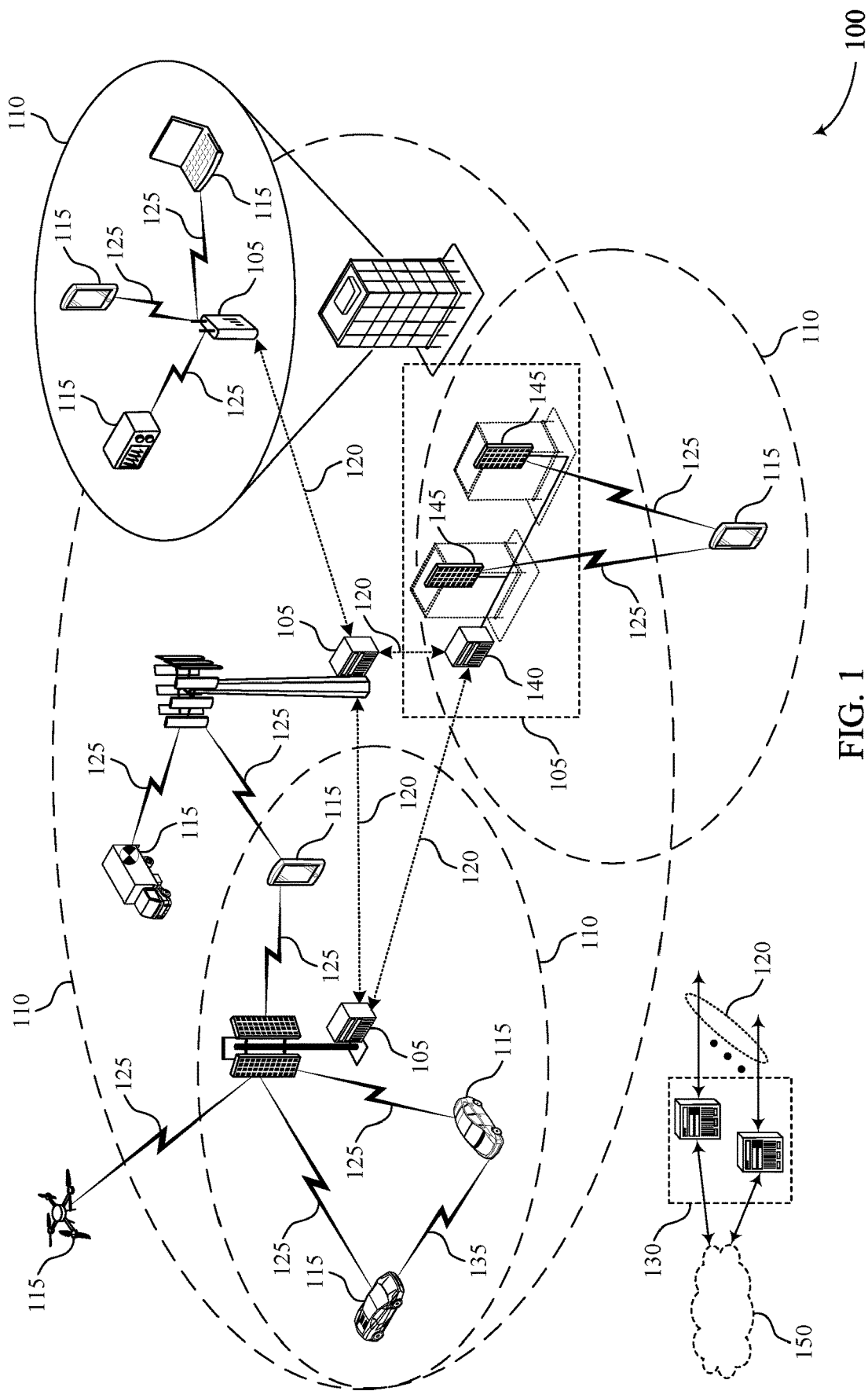
FIG. 1 illustrates an example of a system for wireless communications that supports joint shared channel frequency allocation in downlink control information in accordance with aspects of the present disclosure.

In some wireless communications systems, a base station and a user equipment (UE) may communicate over time frequency resources, such as one or more bandwidth parts (BWPs), for example, of a component carrier in a wireless communications system. In some examples, the wireless communications system may support sub-band full duplex (SBFD) communications between the base station and the UE (e.g., communications implementing one or both of a time division duplexing (TDD) mode or a frequency division duplexing (FDD) mode as described herein). The base station may schedule uplink communications and downlink communications in separate downlink control channel messages (e.g., a first physical downlink control channel (PDCCH) message indicating an uplink BWP and a second PDCCH message indicating a downlink BWP). However, such scheduling may be relatively inefficient, and may lead to increased signaling overhead and decoding complexity at the UE.

According to the techniques described herein, a wireless communications system may implement a joint DCI message scheduling both uplink communications and downlink communications (e.g., DCI jointly indicating uplink shared channel resource allocations and downlink shared channel resource allocations, for example, in one or more sub-bands of an unpaired spectrum in an FDD mode and/or a TDD mode). A base station may transmit a frequency domain resource allocation (FDRA) indication in a single DCI message that indicates both uplink frequency information and downlink frequency information. For example, the UE may receive a control message (e.g., a joint control message) that includes scheduling information (e.g., resource allocations) for a downlink message and an uplink message. The control message may include a set of bits corresponding to a FDRA indication. The UE may determine one or more frequency domain resource allocations based on the set of bits.

In some examples, the set of bits may be an example of a bitmap. The bitmap may correspond to a frequency bandwidth that includes uplink BWPs and downlink BWPs configured for communications between the base station and the UE. Each bit of the bitmap may indicate a resource block group (RBG) allocation for communications. The UE may determine BWPs for receiving downlink messages based on an indicated RBG allocation being within a configured downlink portion of the frequency bandwidth. Additionally, or alternatively, the UE may determine BWPs for transmitting uplink messages based on an indicated RBG allocation being within a configured uplink portion of the frequency bandwidth. In such examples, a single FDRA field in DCI (e.g., the bitmap) may indicate both uplink and downlink frequency allocations.

In some examples, the set of bits may be an example of a resource indicator value (RIV). The UE may determine first frequency information associated with a downlink allocation or an uplink allocation based on the FDRA (e.g., a starting resource block and a quantity of consecutive allocated resource blocks for uplink or downlink messages may be determined from a set of bits of the FDRA). In some examples, the FDRA bitfield may indicate an uplink frequency allocation for one or more uplink BWPs. In some other examples, the FDRA bitfield may indicate a downlink frequency allocation for one or more downlink BWPs (e.g., if a bitfield size indicating a downlink BWP is smaller than a bitfield size indicating the uplink BWP, for example, due to a size of the downlink BWP being smaller than the size of the uplink BWP).

The UE may determine second frequency information based on determining the first frequency information. For example, the UE may identify one or more adjustment factors for determining the second frequency information. In some examples, the UE may determine an adjustment factor based on one or more pre-configured rules (e.g., a scaling parameter K may be determined based on a size of a downlink BWP and a size of an uplink BWP). Additionally, or alternatively, the UE may determine an adjustment factor based on a subset of bits of the set of bits. For example, a first subset of the set of bits, X, may indicate the first frequency information and a second subset of the set of bits, Y, may indicate the adjustment factors for determining the second frequency information (e.g., a scaling parameter B and an offset parameter A may be dynamically selected and indicated by the second subset of the set of bits). As an illustrative example, the UE may scale a frequency allocation of the first frequency information (e.g., multiply a scaling parameter by a quantity of resource blocks), offset a frequency allocation of the first frequency information (e.g., add or subtract a quantity of resource blocks from a starting resource block of the first frequency information), or a combination thereof to determine the second frequency information. In such examples, a single DCI message may indicate both uplink and downlink frequency allocations with a relatively small quantity of bits, which may result in more efficient communications.

In some examples, the UE may determine the second frequency information based on the set of bits that indicate the first frequency information. For example, the FDRA indication may include a set of bits indicating the first frequency information for an uplink message (or a downlink message). A subset of bits of the set of bits may be configured to indicate the second frequency information in addition to indicating a portion of the first frequency information. For example, a quantity of most significant bits (MSBs) or least significant bits (LSBs) of the set of bits may be configured to indicate second frequency information for a downlink message (or uplink message). In some examples, the set of bits may indicate a frequency resource allocation for an uplink message or a downlink message based on comparing a bitfield size associated with the uplink message and a bitfield size associated with the downlink message. As an illustrative example, a quantity of bits to indicate a resource allocation within a downlink BWP using a first resource allocation type may be larger than a quantity of bits to indicate a resource allocation within an uplink BWP using the same or different resource allocation type. In such examples, the set of bits of the FDRA may indicate a frequency allocation for the downlink message and the subset of the set of bits may be configured to indicate a frequency allocation for the uplink message. Accordingly, a single DCI message may indicate both uplink and downlink frequency allocations with a relatively small quantity of bits, which may result in more efficient communications. Additionally, or alternatively, a resource assignment type for an uplink message may be configured independently from a resource assignment type for a downlink message, which may improve a scheduling flexibility at a base station, among other benefits.

Aspects of the disclosure are initially described in the context of wireless communications systems. Aspects of the disclosure are then described in the context of time-frequency diagrams and process flows. Aspects of the disclosure are further illustrated by and described with reference to apparatus diagrams, system diagrams, and flowcharts that relate to joint shared channel frequency allocation in downlink control information.

FIG. 1 illustrates an example of a wireless communications system 100 that supports joint shared channel frequency allocation in downlink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 and a UE 115 may communicate using one or more BWPs, for example, of a component carrier in a wireless communications system. In some examples, the wireless communications system 100 may support SBFD communications between the base station 105 and the UE 115 (e.g., communications over sub-bands of a band in an unpaired spectrum using an FDD mode and/or a TDD mode). The base station may schedule uplink communications and downlink communications in separate downlink control channel messages. However, such scheduling may be relatively inefficient, and may lead to increased signaling overhead and decoding complexity at the UE 115. According to various aspects, the base station 105 may transmit a joint DCI message scheduling both uplink communications and downlink communications (e.g., DCI indicating physical uplink shared channel (PUSCH) and physical downlink shared channel (PDSCH) resource allocations in one or more sub-bands of an unpaired spectrum in an FDD mode and/or a TDD mode). For example, the base station 105 may transmit a FDRA indication in a single DCI message that indicates both uplink frequency information and downlink frequency information. A UE 115 may be configured to identify one or more uplink frequency BWPs and one or more downlink frequency BWPs for communications, for example, in a SBFD operation mode based on the DCI message (e.g., a set of bits of the FDRA indication), one or more bitfield sizes, one or more BWP sizes, or any combination thereof. Such a joint DCI message may result in reduced signaling overhead and decoding complexity in the system, among other benefits. In some examples of the techniques described herein, operations performed by some devices may additionally or alternatively be performed by other devices, additional operations may be included or some operations may be removed, or any combination thereof. As an example, the base station may additionally or alternatively perform some operations described as being performed by a UE (e.g., the base station may identify the one or more uplink frequency BWPs and one or more downlink frequency BWPs, for example, prior to transmitting the DCI message), or vice versa.

Figure 2:
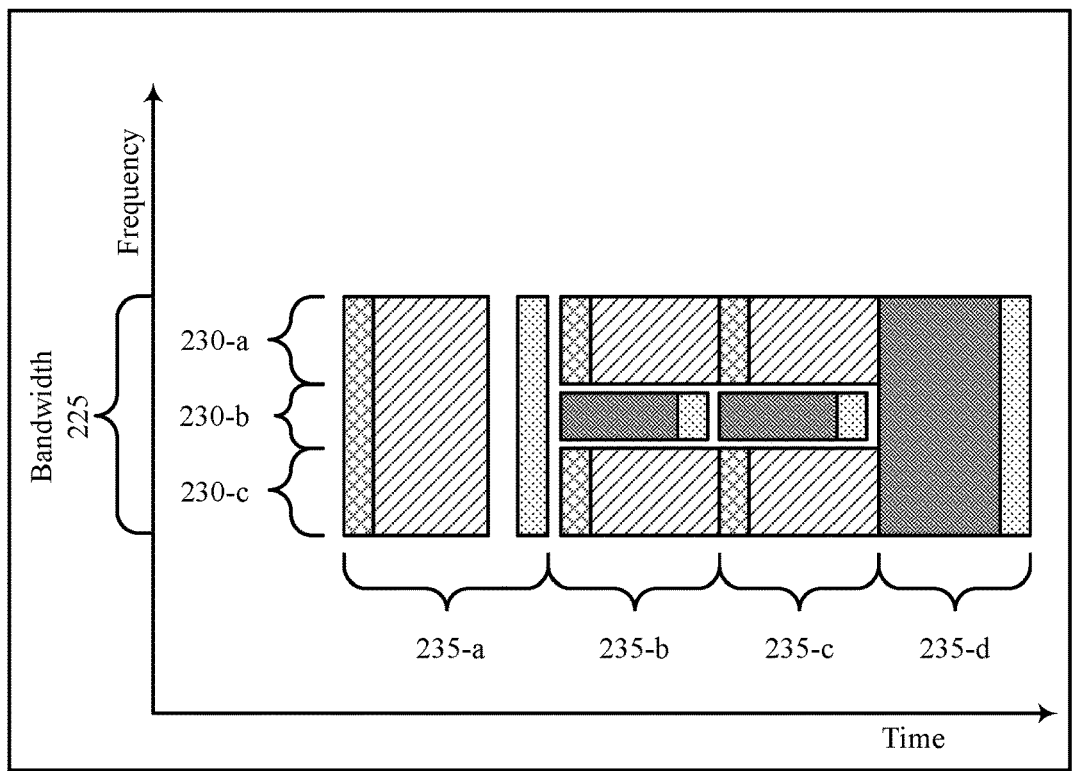
FIG. 2 illustrates an example of a wireless communications system that supports joint shared channel frequency allocation in downlink control information in accordance with aspects of the present disclosure.
Figure 2:
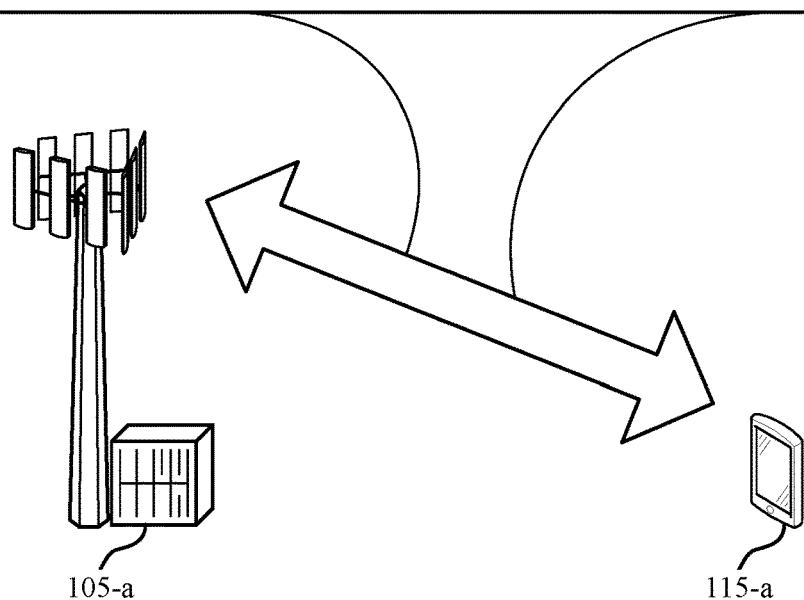
Figure 2:
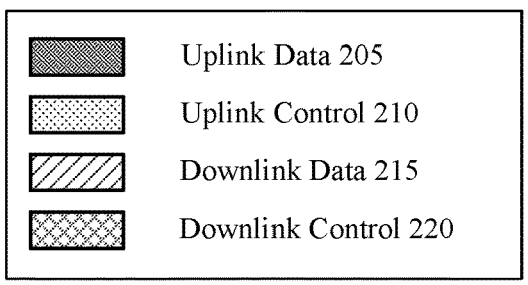

FIG. 2 illustrates an example of a wireless communications system 200 that supports joint shared channel frequency allocation in downlink control information in accordance with aspects of the present disclosure. In some examples, the wireless communications system 200 may implement aspects of the wireless communications system 100. For example, wireless communications system 200 may include UE 115-*a* and base station 105-*a*, which may be examples of UEs 115 and base stations 105 as described with reference to FIG. 1.

In some examples, UE 115-*a* may communicate with base station 105-*a* using time-frequency resources, such as a bandwidth 225. Bandwidth 225 may be used for transmitting or receiving data over resources of one or more regions (e.g., as indicated by uplink data region 205, uplink control region 210, downlink data region 215, downlink control region 220, or any combination thereof). In some cases, bandwidth 225 may be an example of a single frequency band or carrier allocated for both uplink and downlink communications (e.g., the single frequency band may be allocated for both uplink communications and downlink communications, for example, using a TDD mode or FDD mode). For example, bandwidth 225 (e.g., frequency band) used for uplink communications may be the same as the frequency band used for downlink communications, for example, in accordance with a TDD mode.

In some cases, multiple different BWPs may span the bandwidth 225 to allow uplink and downlink communications concurrently (e.g., at least partially overlapping in time) for UE 115-*a*. In some examples, bandwidth 225 may be an example of a single carrier in the unpaired spectrum. In some cases, bandwidth 225 may be separated into one or more BWPs (e.g., BWPs 230-*a*, 230-*b*, and 230-*c*) and the base station 105-*a* may indicate a BWP for receiving a downlink communication (e.g., a PDSCH transmission via the downlink data region 215) or for transmitting an uplink communication (e.g., a PUSCH transmission via the uplink data region 205) to UE 115-*a* for example, in accordance with a FDD mode. Frequency guard bands may be located between BWPs to minimize signaling interference. In some cases, base station 105-*a* may partition bandwidth 225 into different sized BWPs. For example, base station 105-*a* may partition the bandwidth 225 (e.g., an 80 MHz bandwidth) into a first BWP 230-*a* with a first size (e.g., 40 MHz), a second BWP 230-*b* with a second size (e.g., 20 MHz), and a third BWP 230-*c* with a third size (e.g., 20 MHz). Each BWP may be separated into one or more sub-bands that may further permit concurrent uplink and downlink communication for a UE. For example, base station 105-*a* may indicate a sub-band of the BWP for receiving a downlink communication (e.g., a PDSCH transmission via the downlink data region 215) or for transmitting an uplink communication (e.g., a PUSCH transmission via the uplink data region 205) to the UE 115-*a* for example, in accordance with a FDD mode.

In some cases, UE 115-*a* and base station 105-*a* may communicate according to one or more operation modes (e.g., an FDD operation mode, a TDD operation mode, or both), over one or more BWPs. For example, base station 105-*a* may transmit control signaling to UE 115-*a* on bandwidth 225 in an unpaired radio frequency spectrum. In some examples, the control signaling may indicate (e.g., configure) UE 115-*a* with one or more BWPs associated with one or more operation modes from bandwidth 225. For example, the control signaling may indicate one or more downlink BWPs for operation in the TDD mode, one or more uplink BWPs for operation in the TDD mode, or both. Additionally or alternately, separate BWPs may provide operation in FDD mode as each BWP may receive an indication for receiving a downlink communication (e.g., a PDSCH transmission via the downlink data region 215) or for transmitting an uplink communication (e.g., a PUSCH transmission via the uplink data region 205) to UE 115-*a*. For example, in time periods 235-*a* and 235-*d*, UE 115-*a* may receive messages (e.g., downlink or uplink) on BWPs 230-*a*, 230-*b*, or 230-*c* any combination. In time periods 235-*b* and 235-*c*, UE 115-*a* may receive and transmit messages over separate BWPs (e.g., UE 115-*a* may receive PDSCH transmissions via the downlink data region 215 over BWPs 230-*a* and 230-*c*, UE 115-*a* may transmit PUSCH transmissions via the uplink data region 205 over BWP 230-*b*). This communication configuration may be referred to a SBFD configuration.

In some examples, UE 115 may receive DCI from the base station 105 (e.g., via downlink control region 220) indicating a BWP for receiving a downlink communication (e.g., a PDSCH transmission via the downlink data region 215) or for transmitting an uplink communication (e.g., a PUSCH transmission via the uplink data region 205). For example, base station 105-*a* may transmit DCI to UE 115-*a* via downlink control region 220 for each physical channel. For instance, base station 105-*a* may schedule FDRA (e.g., a PDSCH resource) of a first physical channel through a first DCI over a first BWP (e.g., BWP 230-*a*) and FDRA (e.g., a PUSCH resource) of a second physical channel through a second DCI over a second BWP (e.g., BWP 230-*b*). In some examples, however, transmitting multiple DCI messages may result in large signaling overhead and decoding complexity at the base station 105-*a* and the UE 115-*a*. For example, in the case that UE 115-*a* receives multiple DCI messages, UE 115-*a* may decode and perform an error check, such as a cyclic redundancy check (CRC), for each DCI that UE 115-*a* receives, which may increase the number of processing operations that UE 115-*a* may perform.

According to various aspects, base station 105-*a* may jointly schedule multiple physical channels (e.g., PDSCH and PUSCH) between base station 105-*a* and UE 115-*a* (e.g., in an unpaired radio frequency spectrum band). For example, base station 105-*a* may transmit a joint control message that may include scheduling information for a downlink message to be received by the UE and an uplink message to be transmitted by the UE. In some cases, the scheduling information allocates first resources for the downlink message that at least partially overlap with second resources for the uplink message in at least one of time or frequency. In some cases, the joint control message may be received via radio resource control (RRC) signaling, a MAC-CE, or DCI. In some examples, the joint DCI may provide timing information within a time domain resource allocation (TDRA) field or frequency information within an FDRA field, which may indicate time-frequency resources for both the downlink and uplink message for the UE 115-a.

The joint DCI may utilize different DCI formats for providing such information. For example, the joint DCI may have a DCI format 0_0, which may include parameters such as an identifier for DCI formats, FDRA, TDRA, frequency hopping flag, modulation and coding scheme (MCS), new data indicator, redundancy version, hybrid automatic repeat request (HARQ) process number, transmit power control (TPC) command for scheduled PUSCH, and uplink/supplementary uplink indicator. In other examples, the joint DCI may have a DCI format 1_0, which may include parameters such as an identifier for DCI formats, FDRA, TDRA, virtual resource block (VRB) to physical resource block (PRB) mapping, MCS, new data indicator, redundancy version, HARQ process number, downlink assignment index (DAI), TPC command for scheduled physical uplink control channel (PUCCH), PUCCH resource indicator, and PDSCH-to-HARQ feedback timing indicator. In some examples, a FDRA may be configured in accordance with one or more resource assignment types (e.g., type-0, type-1, or dynamic).

In some examples, UE 115-a may determine timing information for the downlink message and the uplink message. In some cases, the downlink timing information may be timing parameters of a TDRA field in the joint control message. Additionally, or alternatively, the uplink timing information may be timing parameters associated with or determined based on the TDRA field, the downlink timing information, higher layer signaling, or other information. In some examples, the TDRA field may indicate a starting symbol, length value, a slot offset, a mapping type, or any combination thereof for each of the uplink and downlink messages.

In some aspects, DCI may indicate a TDRA for PDSCH using a number of the most significant bits (MSBs) or least significant bits (LSBs) of a TDRA bit field in the DCI. The MSB of the TDRA field may indicate one or more characteristics of the PDSCH (e.g., starting symbol, length value, slot offset, mapping type). For example, the MSB of the TDRA field may map to a predefined index for TDRA of the PDSCH. Additionally, some bits of the DCI may indicate one or more characteristics of the PUSCH (e.g., starting symbol, transmission allocation length, transmission slot, mapping type, number of transmission repetitions).

In some examples, the timing information of the PDSCH may be used by the UE 115-a to determine timing information of the PUSCH. For instance, the starting symbol value of a downlink message may be used to obtain the starting symbol, length value, or slot offset or a combination thereof an uplink message. Additionally, a TDRA parameter for the uplink message may configured through higher level signaling or dynamically indicated from a configured set. For example, a base station may transmit a control message indicating a delta symbol value $\Delta_S$ associated with the timing information for the uplink message. The delta symbol value $\Delta_S$ may be used to calculate a starting symbol of an uplink message. In some examples, a base station may transmit a control message indicating a delta slot value $\Delta_K$ associated with the timing information for the uplink message. The delta slot value $\Delta_K$ may be used to calculate a slot for transmission of the uplink message. In some examples, a base station may transmit a length indicator which may determine a symbol length for the uplink message. These parameters, among others, may be used by the UE 115-a to determine timing information for the uplink message.

In some examples, the UE 115-a may determine frequency information for a downlink message (e.g., a communication via a downlink data region 215) and an uplink message (e.g., a communication via an uplink data region 205). In some cases, the frequency information may be frequency parameters identified based on an FDRA field in a joint control message. For example, the frequency information may indicate parameters such as a starting frequency allocation location (e.g., an index of a resource block or RBG), a length of the frequency allocation (e.g., a quantity of resource blocks or RBG scheduled for the channel), an offset between a subband the control message was received and a scheduled downlink or uplink message, among other examples frequency parameters.

The UE 115-a may receive the joint control message that includes scheduling information (e.g., resource allocations) for a downlink message and an uplink message. The joint control message may include a set of bits corresponding to a FDRA indication. The UE 115-a may determine one or more frequency domain resource allocations (e.g., BWPs 230 for uplink allocations and downlink allocations) based on the set of bits.

In some examples, the set of bits may be an example of a bitmap. The bitmap may correspond to a frequency bandwidth 225 that includes uplink BWPs 230 and downlink BWPs 230 scheduled for communications between the base station 105-a and the UE 115-a. Each bit of the bitmap may indicate a RBG allocation for such communications. The UE 115-a may determine BWPs for receiving downlink messages based on an indicated RBG allocation being within a configured downlink portion of the frequency bandwidth 225. Additionally, or alternatively, the UE 115-a may determine BWPs 230 for transmitting uplink messages based on an indicated RBG allocation being within a configured uplink portion of the frequency bandwidth 225. In such examples, a single FDRA field in DCI (e.g., the bitmap) may indicate both uplink and downlink frequency allocations.

In some examples, the set of bits may be an example of an RIV. The UE 115-a may determine first frequency information associated with a downlink allocation or an uplink allocation based on the FDRA (e.g., a starting resource block and a quantity of consecutive allocated resource blocks for uplink or downlink messages may be determined from a set of bits of the FDRA). In some examples, the FDRA bitfield may indicate an uplink frequency allocation for one or more uplink BWPs 230. In some other examples, the FDRA bitfield may indicate a downlink frequency allocation for one or more downlink BWPs 230 (e.g., if a bitfield size indicating a downlink BWP 230 is smaller than a bitfield size indicating the uplink BWP 230, for example, due to a size of the downlink BWP 230 being smaller than the size of the uplink BWP 230).

The UE 115-a may determine second frequency information based on determining the first frequency information. For example, the UE 115-a may identify one or more adjustment factors for determining the second frequency information. In some examples, the UE 115-a may determine an adjustment factor based on one or more pre-configured rules (e.g., a scaling parameter K may be determined based on a size of a downlink BWP 230 and a size of an uplink BWP 230). Additionally, or alternatively, the UE 115-a may determine an adjustment factor based on a subset of bits of the set of bits. For example, a first subset of the set of bits, X, may indicate the first frequency information and a second subset of the set of bits, Y, may indicate the adjustment factors for determining the second frequency information (e.g., a scaling parameter B and an offset parameter A may be dynamically selected and indicated by the second subset of the set of bits). As an illustrative example, the UE 115-a may scale a frequency allocation of the first frequency information (e.g., multiply a scaling parameter by a quantity of resource blocks), offset a frequency allocation of the first frequency information (e.g., add or subtract a quantity of resource blocks from a starting resource block of the first frequency information), or a combination thereof to determine the second frequency information. In such examples, a single DCI message may indicate both uplink and downlink frequency allocations with a relatively small quantity of bits, which may result in more efficient communications.

In some examples, the UE 115-a may determine the second frequency information based on at least some of the set of bits that indicate the first frequency information. For example, the FDRA indication may include a set of bits indicating the first frequency information for an uplink message (or a downlink message). A subset of bits of the set of bits may be configured to indicate the second frequency information in addition to indicating a portion of the first frequency information. For example, a quantity of MSBs or LSBs of the set of bits may be configured to indicate second frequency information for a downlink message (or uplink message). In some examples, the set of bits may indicate a frequency resource allocation for an uplink message or a downlink message based on comparing a bitfield size associated with the uplink message and a bitfield size associated with the downlink message. As an illustrative example, a quantity of bits to indicate a downlink BWP 230 using a first resource allocation type may be larger than a quantity of bits to indicate an uplink BWP 230 using the same or different resource allocation type. In such examples, the set of bits of the FDRA may indicate a frequency allocation for the downlink message and the subset of the set of bits may be configured to indicate a frequency allocation for the uplink message. Accordingly, a single DCI message may indicate both uplink and downlink frequency allocations with a relatively small quantity of bits, which may result in more efficient communications. Additionally, or alternatively, a resource assignment type for an uplink message may be configured independently from a resource assignment type for a downlink message, which may improve a scheduling flexibility at the base station 105-a, among other benefits.

Figure 3:
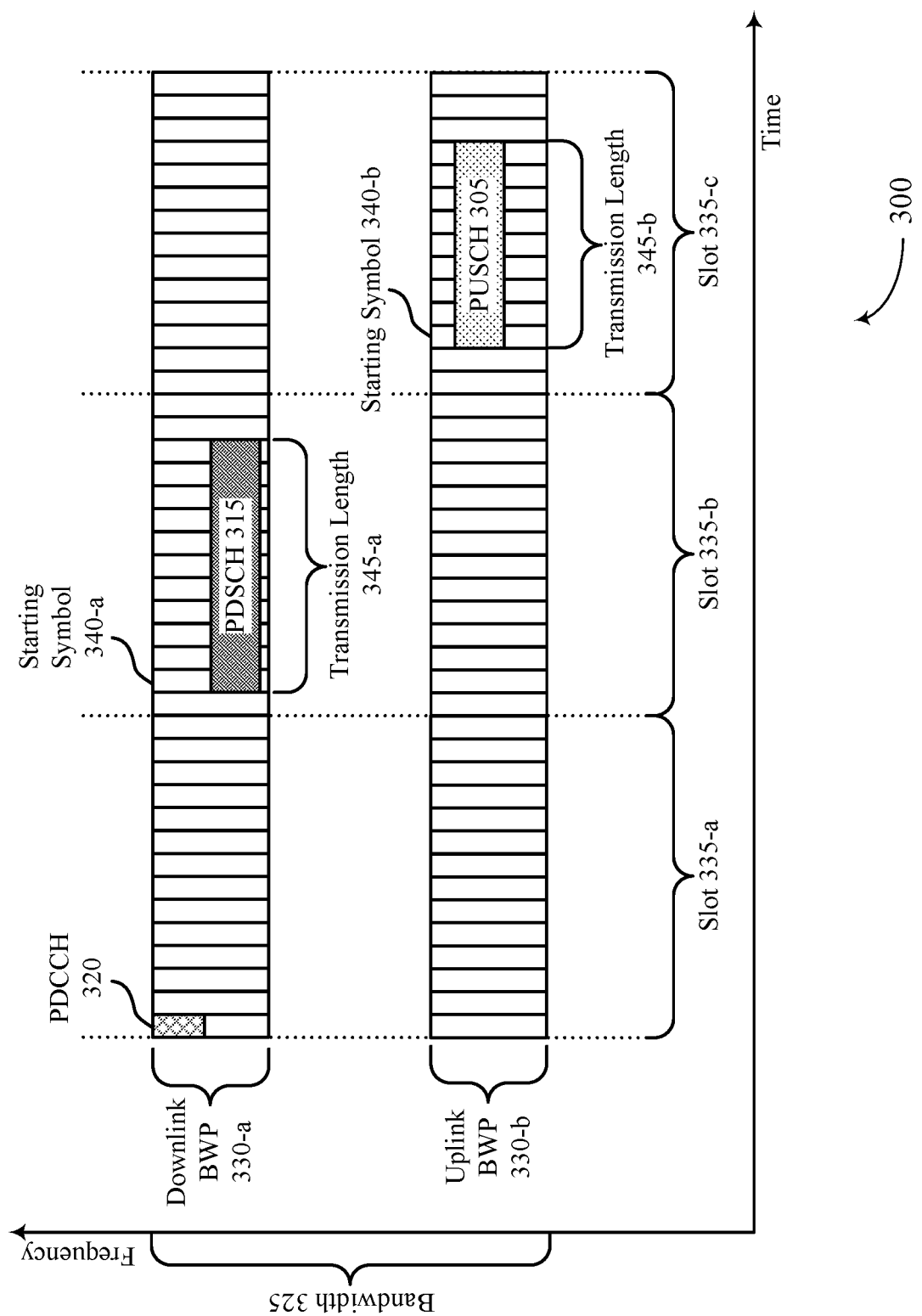
FIGS. 3 and 4 illustrate examples of time-frequency diagrams that support joint shared channel frequency allocation in downlink control information in accordance with aspects of the present disclosure.

FIG. 3 illustrates an example of a time-frequency diagram 300 that supports joint shared channel allocation in DCI in accordance with aspects of the present disclosure. In some examples, time-frequency diagram 300 may be implemented by aspects of wireless communications systems 100 or 200.

In some cases, a UE may indicate one or more BWPs over a carrier bandwidth to be used for communications with a base station. Additionally, the BWPs may be selected for downlink or uplink transmissions. For instance, the UE may select, over carrier bandwidth 325, BWP 330-a for receiving downlink communications and BWP 330-b for transmitting uplink communications to a base station. In some examples, the UE may receive messages from the base station via one or more sub-bands of the downlink BWP 330-a. Additionally, or alternatively, the UE may transmit messages to the base station via one or more sub-bands of the uplink BWP 330-b. In some cases, DCI (e.g., via PDCCH 320) may indicate the direction of communications of the BWP(e.g., downlink or uplink).

In some examples, the base station may indicate TDRA scheduling information for a downlink message through a control message (e.g., DCI). For instance, the DCI may be transmitted to the UE via PDCCH 320. In some examples, a first number of most significant bits (MSBs) in the DCI TRDA bit field may indicate TDRA for PDSCH 315. In other examples, the least significant bits (LSBs) in the DCI TRDA bit field may indicate TDRA for PDSCH 315. The value of the MSBs may provide a row index to an allocation table for PDSCH 315. The row index may be calculated by adding 1 to the value of the MSBs. For example, a first number (e.g., number=3) of MSBs in the DCI TRDA field may indicate TDRA timing information for a downlink message. The value of the MSBs (e.g., 5) may provide a row index (e.g., 6) to an allocation table for PDSCH 315. The allocation table may then set timing information of PDSCH 315 such as starting symbol 340-a $S_{PDSCH}$ (e.g., $S_{PDSCH}=2$), transmission length 345-a $L_{PDSCH}$ (e.g., $L_{PDSCH}=11$), slot offset $K_0$ (e.g., $K_0=1$), and PDSCH mapping type $K_{PDSCH}$ (e.g., demodulation reference signal (DMRS) mapping type $K_{PDSCH}=A$).

The UE may expect to receive the downlink message in a downlink slot $K_{DL}$. In some examples, downlink slot $K_{DL}$ may be represented by Equation 1:

$$K_{DL} = \left\lfloor n \frac{2^{\mu_{PDSCH}}}{2^{\mu_{PDCCH}}} \right\rfloor + K_0 \tag{1}$$

In Equation 1, n may represent the slot of the scheduling DCI. The $\mu_{PDSCH}$ may represent the subcarrier spacing configurations for PDSCH 315 and $\mu_{PDCCH}$ may represent the subcarrier spacing configurations for PDCCH 320. As an illustrative example of implementing Equation 1, slot 335-a may represent slot n, slot 335-b may represent slot n+1, and slot 335-c may represent slot n+2. If the subcarrier spacing of the PDSCH 315 and PDCCH 320 are equal (e.g., 30 kHz), and the slot offset $K_0$ equals 1, then the PDSCH 315 allocation for the downlink message may begin in slot n+1 (e.g., slot 335-b).

In some cases, a base station may transmit a joint control message to a UE that indicates resource allocation information for both an uplink message transmitting to the UE and a downlink message being received by the UE. The joint control message may include DCI for TDRA timing information of multiple physical channels (e.g., PDSCH 315, PUSCH 305). For example, the base station may transmit a joint DCI (e.g., via PDCCH 320) that includes a TDRA field indicating timing information (e.g., starting symbol, transmission length, slot index, mapping type, etc.) for a downlink message to be received by the UE 115. Additionally, based on the timing information for the downlink message, the UE 115 may determine timing information (e.g., starting symbol, transmission length, slot index, mapping type, etc.) for the uplink message.

In some examples, the timing information of a downlink message may be used by the UE to determine the starting symbol 340-b $S_{PUSCH}$. In some examples, starting symbol 340-b $S_{PUSCH}$ may be represented by either Equation 2 or Equation 3:

$$S_{PUSCH} = (S_{PDSCH} + \Delta_S) \bmod 14 \tag{2}$$

$$S_{PUSCH} = (S_{PDCCH} + \Delta_S) \bmod 14 \tag{3}$$

In Equation 2, $S_{PDSCH}$ may represent the starting symbol 340-a of the downlink message. In Equation 3, $S_{PDCCH}$ may represent the starting symbol of the DCI (e.g., starting symbol of PDCCH 320). The delta symbol value $\Delta_S$ in both Equations 2 and 3 may provide more flexibility when setting the $S_{PUSCH}$. For example, if the starting symbol 340-b $S_{PUSCH}$ may be configured using Equation 2, starting symbol 340-a $S_{PDSCH}$ equals 2, and the delta symbol value $\Delta_S$ equals 1, then the starting symbol 340-b $S_{PUSCH}$ equals 3. In other examples, if starting symbol 340-b $S_{PUSCH}$ may be configured using Equation 3, the starting symbol of the DCI $S_{PDCCH}$ equals 1, and the delta symbol value $\Delta_S$ equals 1, then the starting symbol 340-b $S_{PUSCH}$ equals 2. The delta symbol value $\Delta_S$ may be configured via higher level signaling. For instance, the UE may receive a message (e.g., RRC signaling, a medium access control element, or downlink control information) from the base station indicating a delta symbol value $\Delta_S$. The delta symbol value $\Delta_S$ may also be indicated in the joint control message. Additionally, or alternatively, the delta symbol value $\Delta_S$ may be dynamically indicated from a configured set. For example, the base station or UE may select the delta symbol value $\Delta_S$ from the set of delta symbol values based on the set of bits in the DCI. For instance, the DCI may configure 2 bits for the delta symbol value $\Delta_S$. The delta symbol value $\Delta_S$ bits may map to a configured set of values (e.g., {0,4,7,11}). In some cases, the UE or base station may check for error cases in scheduling messages. For instance, an uplink message scheduled sooner than $N_2$ symbols after a downlink message.

In some examples, the timing information of a downlink message may be used by the UE to determine the PUSCH 305 transmission slot $K_2$ of an uplink message. In some examples, the PUSCH 305 transmission slot $K_2$ may be represented by Equation 4:

$$K_2 = \left\lfloor K_{DL} \frac{2^\mu PUSCH}{2^\mu PDSCH} \right\rfloor + \left\lfloor \frac{S_{PDSCH} + \Delta_S}{14} \right\rfloor + \Delta_K \quad (4)$$

In Equation 4, $K_{DL}$ may represent the downlink slot of the downlink message. The $\mu_{PUSCH}$ may represent the subcarrier spacing configurations for PUSCH 305 and $\mu_{PDSCH}$ may represent the subcarrier spacing configurations for PDSCH 315. $S_{PDSCH}$ may represent the starting symbol 340-a of the downlink message, and the delta symbol value $\Delta_S$ may represent a higher layer signaled variable. The delta slot value $\Delta_K$ in Equation 4 may provide more flexibility when setting transmission slot $K_2$. As an illustrative example of implementing Equation 4, slot 335-a may represent slot n, slot 335-b may represent slot n+1, and slot 335-c may represent slot n+2. If the subcarrier spacing of the PDSCH 315 and PDCCH 320 are equal (e.g., 30 kHz), $K_{DL}$ equals n+1, starting symbol 340-b $S_{PDSCH}$ equals 2, the delta symbol value $\Delta_S$ equals 1, and the delta slot value $\Delta_K$ equals 1, then the PUSCH 305 allocation for the uplink message may begin in slot n+2 (e.g., slot 335-c). The delta slot value $\Delta_K$ may be configured via higher level signaling. For instance, the UE may receive a message (e.g., RRC signaling, a medium access control element, or downlink control information) from the base station indicating a delta slot value $\Delta_K$. The delta slot value $\Delta_K$ may also be indicated in the joint control message. Additionally, or alternatively, the delta slot value $\Delta_K$ may be dynamically indicated from a configured set. For example, the base station or UE may select the delta slot value $\Delta_K$ from the set of delta slot values based on the set of bits in the DCI. For instance, the DCI may configure 1 bit for the delta slot value $\Delta_K$. The delta slot value $\Delta_K$ bit may map to a configured set of values (e.g., {0,1}).

In some examples, the timing information of a downlink message may be used by the UE to determine a transmission length 345-b of the uplink message. A length indicator $L_{PUSCH}$ may be used to determine the transmission length 345-b (e.g., the nominal duration) for the PUSCH 305. In some cases, the length indicator $L_{PUSCH}$ may explicitly indicate the number of symbols of the transmission length 345-b and the length indicator $L_{PUSCH}$ may be configured via higher layer signaling. For instance, the UE may receive a message (e.g., RRC signaling, a MAC-CE, or DCI) from the base station indicating a length indicator $L_{PUSCH}$. The length indicator $L_{PUSCH}$ may, in some cases, be indicated in the joint control message (e.g., PDCCH 320). Additionally, or alternatively, the length indicator $L_{PUSCH}$ may be dynamically indicated from a configured set. For example, the length indicator $L_{PUSCH}$ may correspond to a set of symbol values and the UE or base station may select the transmission length 345-b from the set of symbol values. In some aspects, the DCI may configure 2 bits for delta-s, which may map to a configured set of values (e.g., {4, 7, 11, 14}). In some cases, the length indicator $L_{PUSCH}$ may be based on the starting symbol 340-b determined for PUSCH 305. For instance, if the starting symbol 340-b is less than 7, then the sum of the starting symbol 340-b and the transmission length 345-b is 14 symbols. Otherwise, the sum of the starting symbol 340-b and the transmission length 345-b is 21 symbols.

According to some aspects, a mapping type (e.g., Type A or Type B) may be determined for the DMRS for PUSCH 305. In some examples, one mapping type, such as one of Type A or Type B, is supported for DMRS for PUSCH 305. In other examples, Type A may be supported based on bits of a DCI field (e.g., contained within PDCCH 320), the starting symbol 340-b, or the transmission length 345-b. For instance, if the first X bits of the TDRA field within DCI carried via PDCCH 320 may indicate that mapping Type A is supported. Additionally, or alternatively, if the starting symbol 340-b is symbol index 0 (the first symbol in slot 335-c) and the sum of the starting symbol 340-b and the transmission length 345-b is determined to be greater than 4 symbols, DMRS mapping Type A may be supported and used for transmission of PUSCH 305.

In some examples, a number of repetitions of PUSCH 305 may be determined by the UE or base station. For example, DCI may be used to dynamically indicate the number of repetitions for PUSCH 305, which may be represented as $K_{PUSCH}$. In some cases, $K_{PUSCH}$ may be the same as the number of repetitions for PDSCH 315, $K_{PDSCH}$, and may be indicated to the UE via DCI (e.g., one or more bits within DCI carried by PDCCH 320 may indicate to the UE that the number of repetitions for PDSCH 315 and PUSCH 305 are the same). In some examples, a UE may be configured with a fixed value that may be used to determine $K_{PUSCH}$ based on $K_{PDSCH}$ such that the fixed value is added to $K_{PDSCH}$ to determine $K_{PUSCH}$. For example, the fixed value may be 1 and in an illustrative example, if $K_{PDSCH}$ is 2 repetitions, $K_{PUSCH}$ may be the sum of $K_{PDSCH}$ and the fixed value (in this case, 2+1=3 repetitions for $K_{PUSCH}$). Such techniques may utilize the reciprocity between uplink and downlink in the unpaired spectrum. Additionally, or alternatively, $K_{PUSCH}$ may configured via higher layer signaling. For example, the UE may receive a message (e.g., RRC signaling, a MAC-CE, or DCI) from the base station indicating the number of repetitions for PUSCH 305 $K_{PUSCH}$.

Based on the timing information determined for PUSCH 305 and PDSCH 315, the UE may transmit PUSCH 305 in accordance with the uplink timing information and may receive PDSCH 315 in accordance with the downlink timing information.

Figure 4:
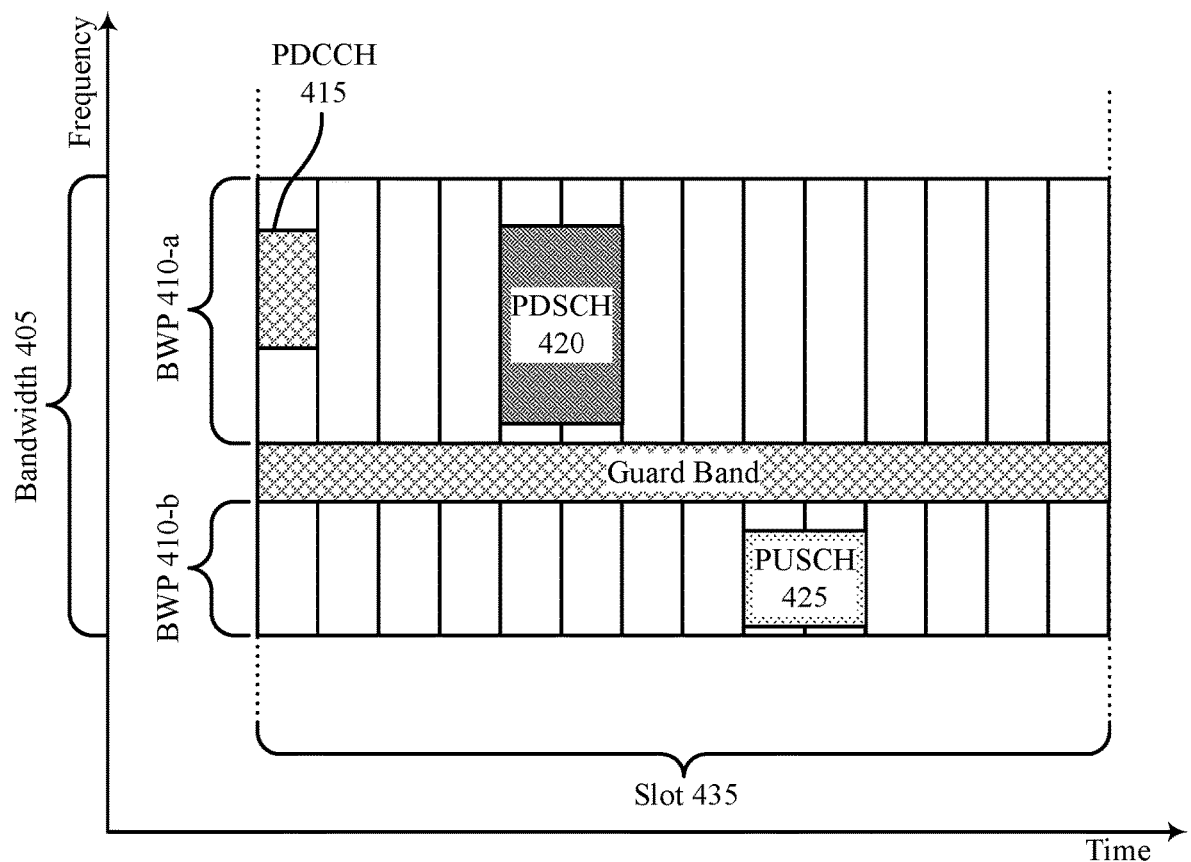

FIG. 4 illustrates an example of a time-frequency diagram 400 that supports joint shared channel frequency allocation in downlink control information in accordance with aspects of the present disclosure. In some examples, time-frequency diagram 400 may implement aspects of wireless communications systems 100 and 200. For example, the time-frequency diagram 400 may be an example of communications between a base station 105 and a UE 115 as described with reference to FIGS. 1 and 2. The time-frequency diagram 400 may illustrate an example of a joint control message scheduling uplink and downlink communications. For example, DCI transmitted in a PDCCH message 415 may indicate time-frequency resources for the PDSCH message 420 and the PUSCH message 425 as described herein.

A base station may transmit the PDCCH message 415 (e.g., a joint control message) including an FDRA field, a TDRA field, or both. The FDRA field may indicate both uplink frequency information and downlink frequency information. For example, a UE may receive the PDCCH message 415 that includes scheduling information (e.g., resource allocations) for a PDSCH message 420 and a PUSCH message 425. The PDCCH message 415 may include a set of bits corresponding to a FDRA indication. The UE may determine one or more frequency domain resource allocations based on the set of bits. For example, the UE may use the set of bits to determine a frequency range (e.g., a subband) to transmit the PDSCH message 420 in a BWP 410-a and a frequency range to receive the PUSCH message 425 in a BWP 410-b.

In some examples, the FDRA may be configured to be a type-0, a type-1, or a dynamic resource allocation type. For example, the FDRA may be type-0 and the frequency resource allocation may be in the form of a bitmap, where each bit of the bitmap may correspond to a nominal RBG allocation of a quantity of consecutive resource blocks. In some examples, the quantity of consecutive resource blocks may be configured and/or may depend on a size of a BWP 410 associated with the frequency allocation. Additionally, or alternatively, the FDRA may be type-1 and the frequency resource allocation may be in the form of a consecutive resource block allocation (e.g., determined in accordance with a RIV equation), where a starting resource block and a quantity of consecutive (e.g., consecutive in frequency, or time) allocated resource blocks are determined based on the FDRA. In some examples, the type-1 FDRA may be supported by a fallback DCI procedure.

In some examples, the FDRA may be a set of bits corresponding to both first frequency information for a downlink message (e.g., the PDSCH message 420) and second frequency information for an uplink message (e.g., the PUSCH message 425). For example, the FDRA may be a type-0 and may include a bitmap. The bitmap may be defined over a bandwidth 405 covering all of the configured (e.g., scheduled) uplink and downlink BWPs 410 (e.g., the uplink BWP 410-b and the downlink BWP 410-a) in the slot 435. A bit in the bitmap may indicate that an associated RBG is allocated for communications (e.g., a value of 0 may indicate that the associated RBG is allocated for communications and a value of 1 may indicate that the associated RBG is not allocated for communications). The UE may be configured to determine whether the RBG is allocated for a downlink message or an uplink message based on a location of the RBG in the bandwidth 405. For example, if the RBG with a flagged bit (e.g., a bit with a value of 1) indicating an allocation is within the BWP 410-a corresponding to downlink communications, the UE may determine that the allocation is for a PDSCH message 420. If the RBG with a flagged bit (e.g., a bit with a value of 1) indicating an allocation is within the BWP 410-b corresponding to uplink communications, the UE may determine that the allocation is for a PUSCH message 425. Accordingly, a single FDRA field in DCI may indicate both uplink and downlink resource allocation. In some examples, a bitfield size of an FDRA including a bitmap for both uplink and downlink allocations may be larger than a bitfield size of an FDRA including a bitmap for one of the uplink or downlink communications.

In some examples, the UE may determine first frequency information associated with a downlink allocation or an uplink allocation based on the FDRA. For example, the FDRA may include a set of bits (e.g., a bitfield) indicating resource allocation information. In some examples, the first frequency information may correspond to an uplink allocation (e.g., bits of the FDRA may indicate frequency information for the PUSCH message 425 in the BWP 410-b). In some other examples, the first frequency information may correspond to a downlink allocation (e.g., bits of the FDRA may indicate frequency information for the PDSCH message 420 in the BWP 410-a). The UE may be configured to determine the first frequency for the uplink allocation or the downlink allocation based on one or more sizes of the BWPs 410. For example, the UE may compare a size of the BWP 410-a (e.g., a quantity of physical resource blocks of the BWP 410-a) associated with downlink communications to a size of the BWP 410-b associated with uplink communications. The UE may determine that the first frequency information corresponds to the uplink allocation based on the size of the BWP 410-b being smaller (or larger) than the size of the BWP 410-a. Alternatively, the UE may determine that the first frequency information corresponds to the downlink allocation based on the size of the BWP 410-a being smaller (or larger) than the size of the BWP 410-a. In some examples, a relatively smaller BWP 410 may use less bits in an FDRA indication (e.g., a relatively smaller bitfield of the FDRA may be realized). In some examples, determining the first frequency information includes determining the frequency information in accordance with a RIV equation (e.g., for a type 1 resource allocation).

In some examples, the UE may determine second frequency information based on determining the first frequency information. For example, the UE may identify one or more adjustment factors for determining the second frequency information. In some examples, the UE may determine an adjustment factor based on one or more pre-configured rules (e.g., rules configured by RRC signaling or a configuration of the UE). As an illustrative example, the UE may identify a scaling parameter (e.g., a scaling parameter K) based on a size of a downlink BWP 410-a and a size of an uplink BWP 410-b. For example, K may be a maximum value from a set of values, such as 1, 2, 4, 8, etc., that satisfies an equation $$K \leq \left\lceil \frac{DL_{BWP}}{UL_{BWP}} \right\rceil$$

where $DL_{BWP}$ represents the size of the downlink BWP 410-*a* and $UL_{BWP}$ represents the size of the uplink BWP 410-*b* (e.g., a quantity of physical resource blocks of the BWP 410-*b*).

Additionally, or alternatively, the UE may determine an adjustment factor based on a subset of bits of the set of bits of an FDRA. For example, a first subset of the set of bits (e.g., X MSBs or LSBs in the FDRA) may indicate the first frequency information and a second subset of the set of bits (e.g., Y bits in the FDRA where the FDRA includes X+Y total bits) may indicate the adjustment factors for determining the second frequency information. For example, a scaling parameter B and an offset parameter A may be dynamically selected (e.g., by a base station), for example, from a higher layer configured set of parameters (e.g., A may be a value between 10 and 20, B may be a value of 1, among other examples of parameters). Such parameters may be indicated by the second subset of the set of bits (e.g., Y bits, such as 1 bit in the FDRA).

The UE may identify the second frequency information based on the first frequency information and/or the one or more adjustment factors. For example, the UE may identify the first frequency information from the set of bits of the FDRA and adjust the first frequency information to derive the second frequency information. As an illustrative example, the first frequency information may correspond to the uplink allocation, and the UE may scale a starting resource block of the first frequency information to determine a starting resource block of the second frequency information in accordance with by Equation 1:

$$RB_{S_{PDSCH}} = K * RB_{S_{PUSCH}} \quad (1)$$

In Equation 1, $RB_{S_{PDSCH}}$ may represent the starting resource block of the PDSCH message 420, K may represent the scaling factor determined as described herein, and $RB_{S_{PUSCH}}$ may represent the starting resource block of the PUSCH message 425. Additionally, or alternatively, the UE may scale the quantity of resource blocks of the first information to determine the quantity of resource blocks of the second frequency information, for example, in accordance with Equation 2:

$$L_{RB_{PDSCH}} = K * L_{RB_{PUSCH}} \quad (2)$$

In Equation 2, $L_{RB_{PDSCH}}$ may represent a frequency length in resource blocks of the PDSCH message 420 and $L_{RB_{PUSCH}}$ may represent a frequency length in resource blocks of the PUSCH message 425.

As another illustrative example of adjusting the first frequency information to determine the second frequency information, the UE may implement Equations 3 and 4:

$$L_{RB_{PDSCH}} = B * L_{RB_{PUSCH}} \quad (3)$$

$$RB_{S_{PDSCH}} = A + RB_{S_{PUSCH}} \quad (4)$$

In Equations 3 and 4, B may represent a scaling parameter and A may represent an offset parameter determined as described herein.

In some examples, the UE may determine the second frequency information based on the set of bits that indicate the first frequency information. For example, the FDRA indication may include a set of bits indicating the first frequency information for the PUSCH message 425 (or the PDSCH message 420). The UE may be configured to determine that the first frequency information corresponds to the uplink allocation or the downlink allocation based on one or more bitfield sizes. For example, the UE may compare a bitfield size associated with the PDSCH (e.g., the PDSCH message 420) to a bitfield size associated with the PUSCH (e.g., the PUSCH message 425). For example, the UE may compare a quantity of bits resulting from a resource assignment type of a downlink allocation and/or a size of the BWP 410-*a* to a quantity of bits resulting from a resource assignment type of a downlink allocation and/or a size of the BWP 410-*b*. The UE may determine that the first frequency information corresponds to the uplink allocation based on the bitfield size of the uplink allocation being larger than bitfield size of the downlink allocation. Alternatively, the UE may determine that the first frequency information corresponds to the downlink allocation based on the bitfield size of the downlink allocation being larger than bitfield size of the uplink allocation.

In some examples, the subset of bits may be repurposed (e.g., by a base station) to indicate the secondary frequency information. For example, a subset of bits of the set of bits (e.g., Y LSBs or MSBs of the bitfield of the FDRA) may be configured to indicate the second frequency information for the PDSCH (e.g., the PDSCH message 420) or the PUSCH (e.g., the PUSCH message 425) in addition to indicating a portion of the first frequency information. In some examples, the quantity of bits included in the subset of bits may be based on a size of the BWP 410-*a*, a size of the BWP 410-*b*, a resource assignment type for the PUSCH (e.g., the PUSCH message 425), a resource assignment type for the PDSCH (e.g., the PDSCH message 420), or any combination thereof. In some examples, by implementing a set of bits of an FDRA to indicate the first frequency information and using a subset of the set of bits to indicate the second frequency information, a resource assignment type for the PDSCH message 420 may be independently configured from the resource assignment type for the PUSCH message 425.

In some examples, the various operations described in the time-frequency diagram 400 may be performed in different orders or combinations, or may be performed by different devices. For example, operations performed by the UE may be performed by a base station, or operations performed by the base station may be performed by the UE, among other examples.

Figure 5:
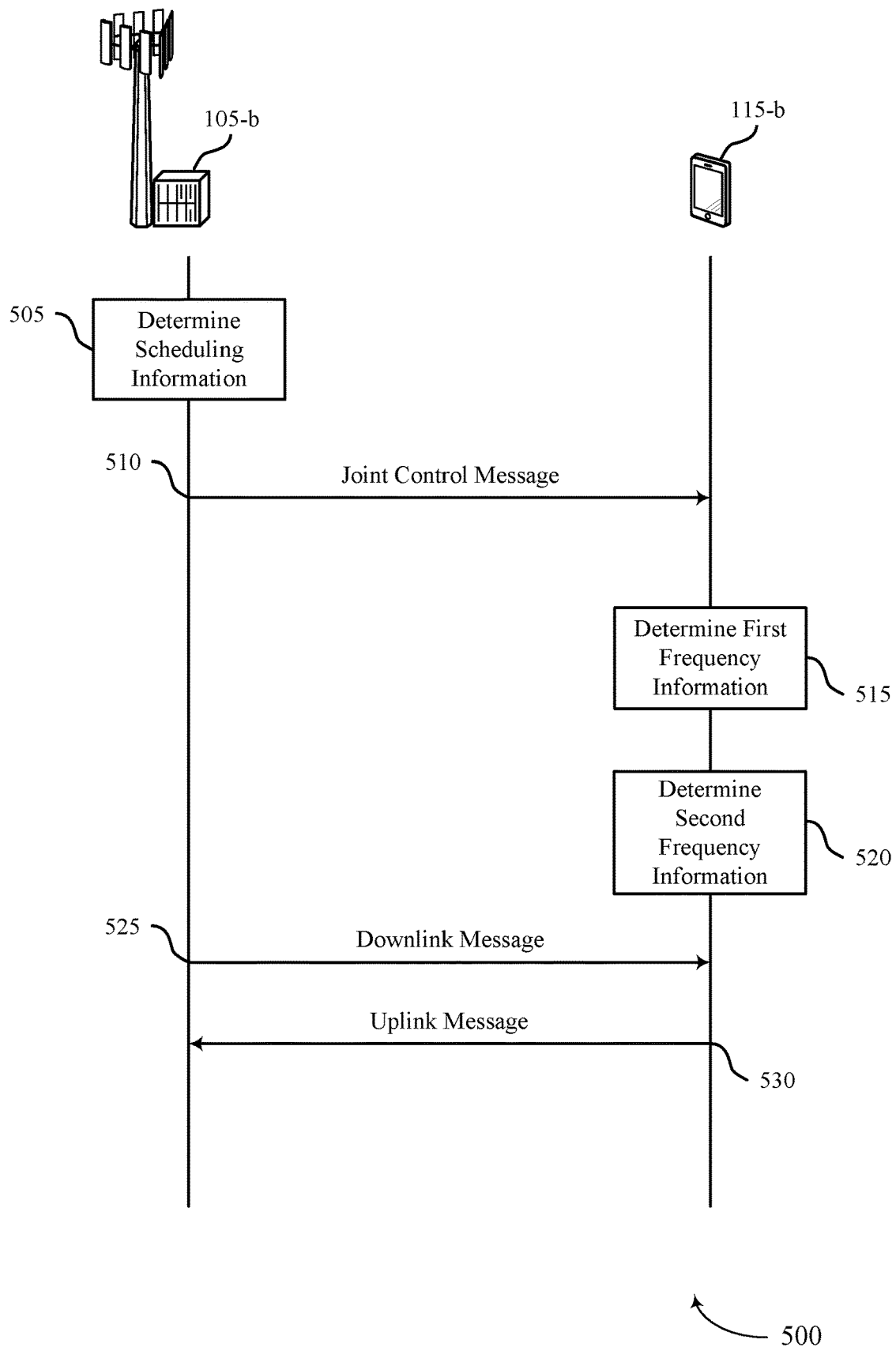
FIG. 5 illustrates an example of a process flow that supports joint shared channel frequency allocation in downlink control information in accordance with aspects of the present disclosure.

FIG. 5 illustrates an example of a process flow 500 that supports joint shared channel frequency allocation in downlink control information in accordance with aspects of the present disclosure. In some examples, process flow 500 may implement aspects of wireless communications systems 100 or 200. Process flow 500 may include a UE 115-*b* and a base station 105-*b*, which may be examples of corresponding devices as described herein. Alternative examples of the following may be implemented, where some steps are performed in a different order than described or are not performed at all. In some cases, steps may include additional features not mentioned below, or further steps may be added.

At 505, base station 105-*b* may determine scheduling information for the UE 115-*b*. The scheduling information may include information for a downlink message to be received by the UE 115-*b* and an uplink message to the transmitted by the UE 115-*b*. In some cases, the time-frequency resources for the uplink and downlink messages may at least partially overlap in one of time or frequency. Additionally, or alternatively, the downlink message and the uplink message may be scheduled via the same carrier.

At 510, the base station 105-*b* may transmit a joint control message to the UE 115-*b*. The joint control message may indicate the scheduling information for the uplink and downlink messages as determined by the base station 105-*b* at 505. In some examples, the joint control message may be a joint DCI message that includes a FDRA field, which may indicate frequency information for one or both of the uplink and downlink messages for the UE 115-*b*. For example, the joint DCI message may be transmitted via a PDCCH transmission.

At 515, the UE 115-*b* may determine first frequency information for the downlink message (or uplink message) based on the joint control message. For example, the UE 115-*b* may determine the first frequency information from a FDRA field as described with reference to FIGS. 1-4.

At 520, the UE 115-*b* may determine second frequency information for the uplink message (or downlink message) based on the joint control message, the first frequency information determined at 515, one or more rules, etc., as described herein. For example, the UE 115-*b* may adjust the first frequency information using one or more adjustment parameters, determine the second frequency information from the set of bits of a FDRA field or a subset of bits of the set of bits, or any combination thereof.

At 525, the base station 105-*b* may transmit, and the UE 115-*b* may receive, the downlink message scheduled by the joint control message transmitted at 510. The downlink message may be communicated based on the frequency information included in the joint control message or determined by the UE 115-*b* at 515 and 520. In some examples, the downlink message may be received at the UE 115-*b* via a carrier that is different than the carrier used for transmission of the joint control message at 510. For example, the joint control message may be an example of a cross-carrier scheduling message. Additionally, or alternatively, the downlink message may be transmitted via the same carrier as an uplink message and may partially overlap in time with the uplink message. In some examples, the downlink message may be transmitted via a PDSCH transmission.

At 530, the UE 115-*b* may transmit an uplink message to the base station 105-*b* scheduled by the joint control message transmitted at 510. The uplink message may be transmitted based on the frequency information included in the joint control message or determined by the UE 115-*b* at 515 and 520. In some examples, the uplink message may be transmitted by the UE 115-*b* via a carrier that is different than the carrier used for transmission of the joint control message at 510. In some cases, the uplink message may be transmitted via the same carrier as the downlink message received at 525 and may partially overlap in time with the downlink message. In some examples, the MCS associated with the uplink message may be different than the MCS of the downlink message. In some examples, the uplink message may be transmitted via a PUSCH transmission.

Figure 6:
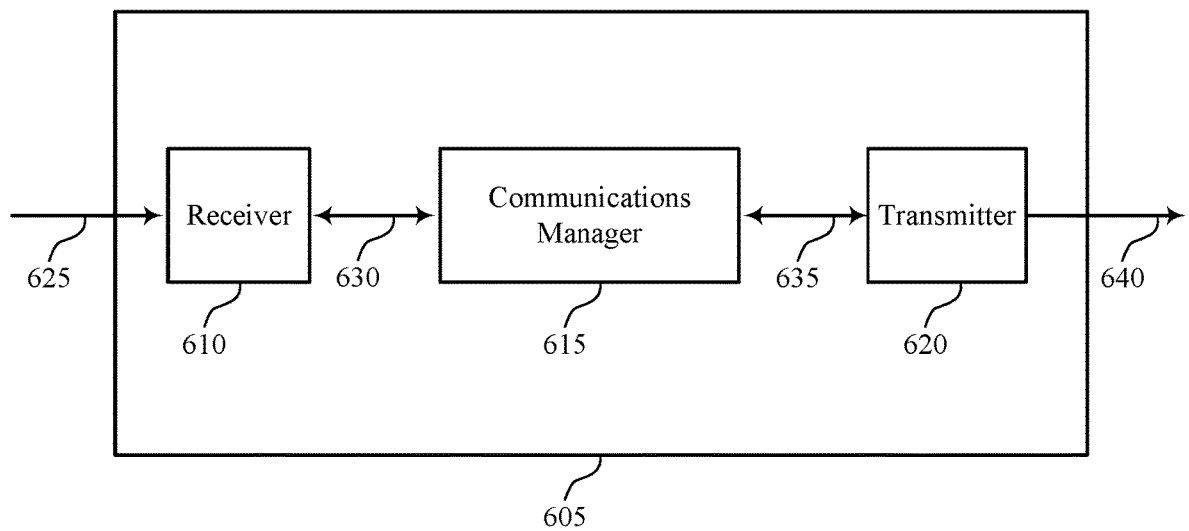
FIGS. 6 and 7 show block diagrams of devices that support joint shared channel frequency allocation in downlink control information in accordance with aspects of the present disclosure.

FIG. 6 shows a block diagram 600 of a device 605 that supports joint shared channel frequency allocation in downlink control information in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information 625 such as packets, user data, or control information associated with various information channels (e.g., control channels, data channels, and information related to joint shared channel frequency allocation in downlink control information, etc.). For example, the receiver 610 may demodulate signals received over monitored time-frequency resources to obtain bits that indicate the information 625 (e.g., the information 625 may include a set of bits of an FDRA). Information may be passed on to other components of the device 605. The receiver 610 may pass this information, as information 630, on to other components of the device 605. For example, the receiver 610 may electrically send the information 630 received from another device (e.g., a base station 105) to the communications manager 615. The receiver 610 may be an example of aspects of the transceiver 920 described with reference to FIG. 9. The receiver 610 may utilize a single antenna or a set of antennas.

The communications manager 615 may receive, from a base station, a control message that includes scheduling information for a downlink message to be received by the UE and an uplink message to be transmitted by the UE. For example, the communications manager 615 may receive the scheduling information, including a set of bits of a FDRA, from the receiver 610 as information 630. The communications manager 615 may determine first frequency information for the downlink message and second frequency information for the uplink message based on the scheduling information and a comparison between a first bitfield size associated with resource allocation for a first bandwidth part associated with the downlink message and a second bitfield size associated with resource allocation for a second bandwidth part associated with the uplink message, and communicate the uplink message and the downlink message with the base station according to the first frequency information and the second frequency information. In some examples, the communications manager 615 may send information 635 to the transmitter 620 (e.g., the communications manager 615 may send data of an uplink message to the transmitter 620 as the information 635). The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may enable a UE 115 to receive a control message (e.g., a joint control message) scheduling both uplink and downlink communications, which may reduce signaling overhead and increase communications efficiency, among other advantages.

Based on implementing the techniques described herein, a processor of the UE 115 (e.g., a processor controlling the receiver 610, the communications manager 615, the transmitter 620, or a combination thereof) may reduce processing complexity, for example, due to a relatively smaller quantity of bits to decode when receiving scheduling information, monitoring and/or decoding less PDCCH messages, etc., which may save power at the UE 115 and reduce decoding complexity, among other advantages.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas. In some examples, the communications manager 615 may send information 635 to the transmitter 620 (e.g., the communications manager 615 may send data of an uplink message to the transmitter 620 as the information 635), and the transmitter 620 may send the information 635 to another device (e.g., a base station) as information 640.

Figure 7:
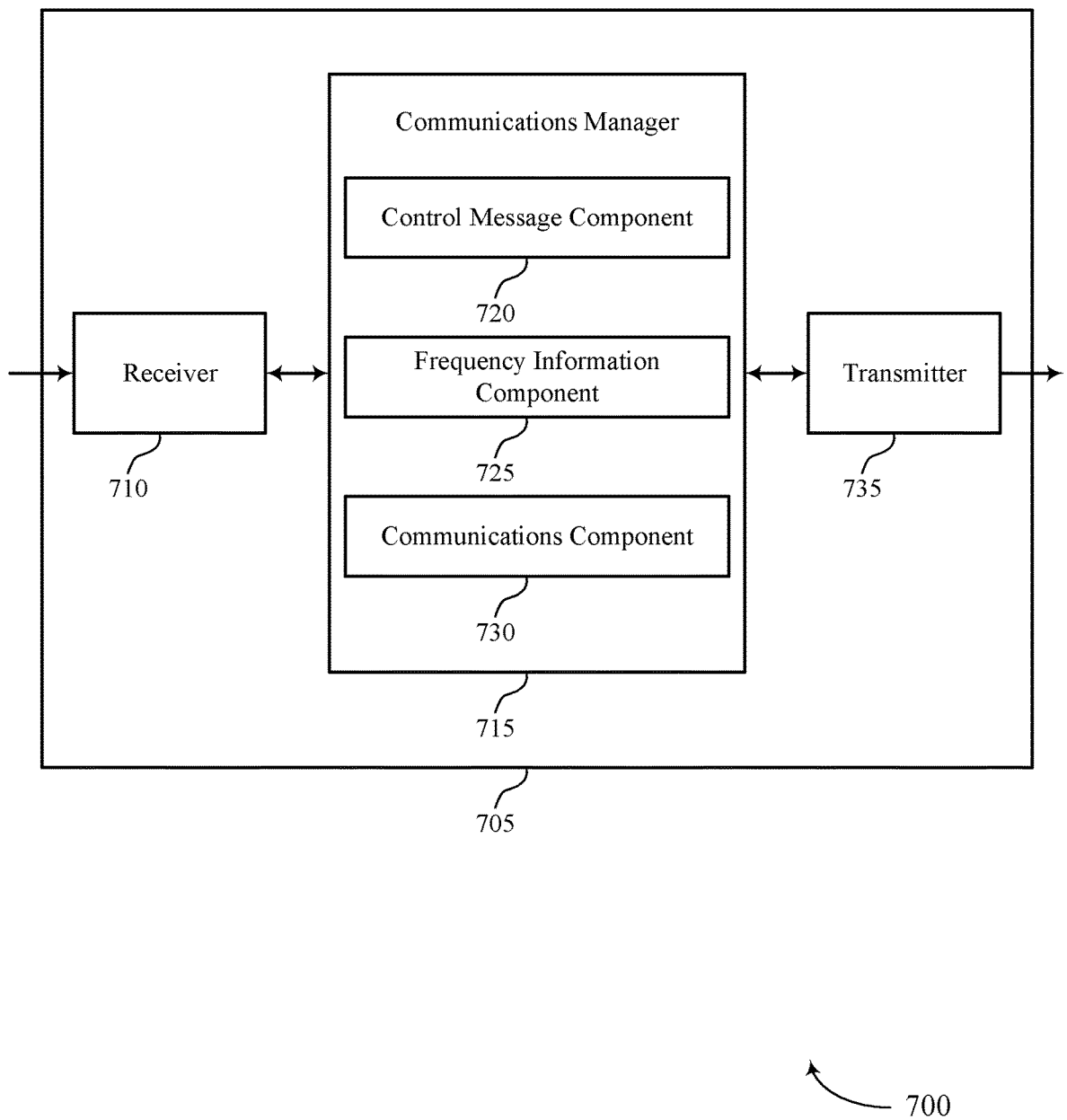

FIG. 7 shows a block diagram 700 of a device 705 that supports joint shared channel frequency allocation in downlink control information in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to joint shared channel frequency allocation in downlink control information, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control message component 720, a frequency information component 725, and a communications component 730. The communications manager 715 may be an example of aspects of the communications manager 910 described herein.

The control message component 720 may receive, from a base station, a control message that includes scheduling information for a downlink message to be received by the UE and an uplink message to be transmitted by the UE.

The frequency information component 725 may determine first frequency information for the downlink message and second frequency information for the uplink message based on the scheduling information and a comparison between a first bitfield size associated with resource allocation for a first bandwidth part associated with the downlink message and a second bitfield size associated with resource allocation for a second bandwidth part associated with the uplink message.

The communications component 730 may communicate the uplink message and the downlink message with the base station according to the first frequency information and the second frequency information.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
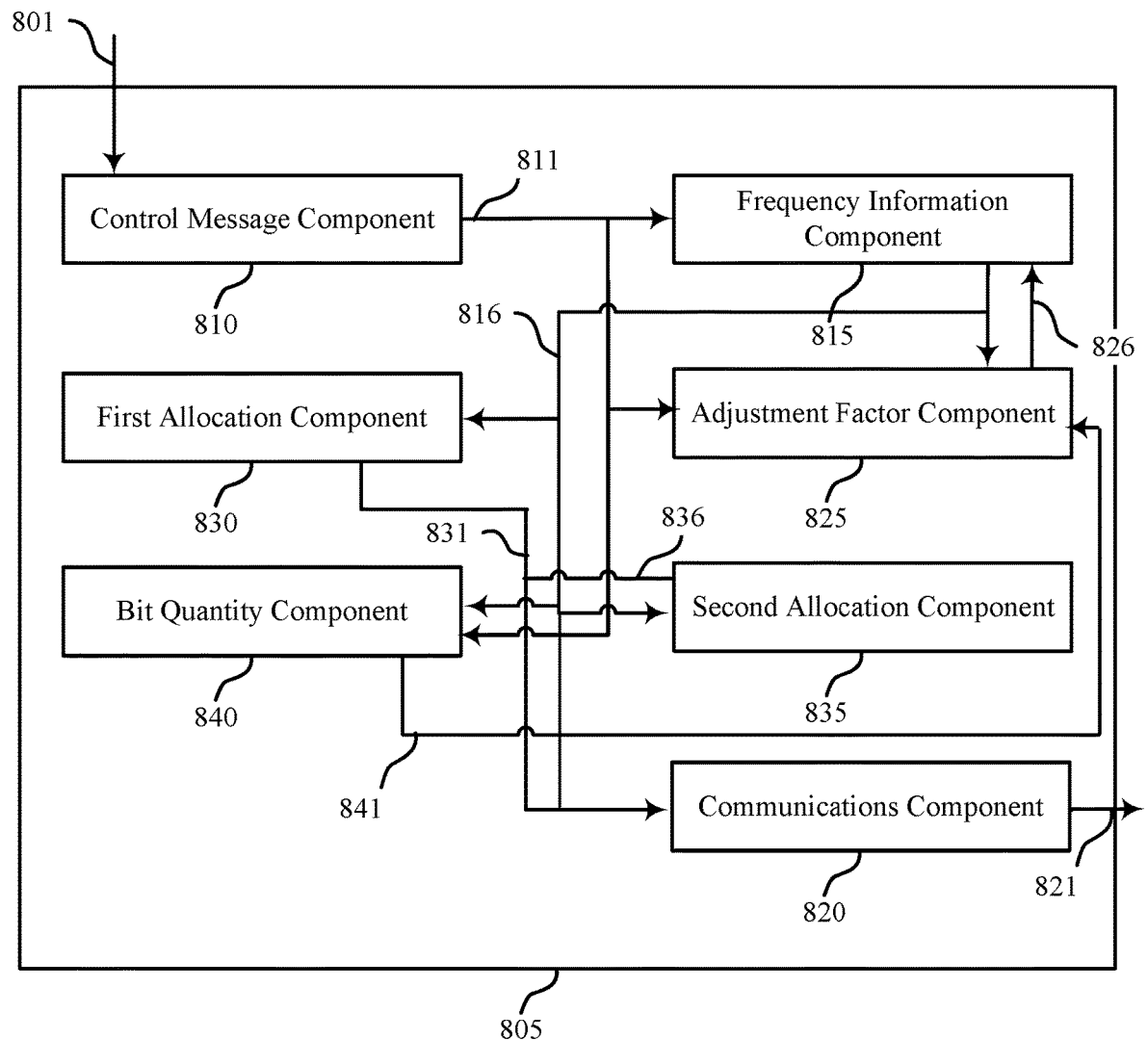
FIG. 8 shows a block diagram of a communications manager that supports joint shared channel frequency allocation in downlink control information in accordance with aspects of the present disclosure.

FIG. 8 shows a block diagram 800 of a communications manager 805 that supports joint shared channel frequency allocation in downlink control information in accordance with aspects of the present disclosure. The communications manager 805 may be an example of aspects of a communications manager 615, a communications manager 715, or a communications manager 910 described herein. The communications manager 805 may include a control message component 810, a frequency information component 815, a communications component 820, an adjustment factor component 825, a first allocation component 830, a second allocation component 835, and a bit quantity component 840. Each of these modules may communicate, directly or indirectly, with one another (e.g., via one or more buses).

The control message component 810 may receive, from a base station, a control message 801 (e.g., a joint control message) that includes scheduling information for a downlink message to be received by the UE and an uplink message to be transmitted by the UE. For example, the control message component 810 may include or be in communication with an example of a receiver 610 as described with reference to FIG. 6 (e.g., the control message component may receive control message 801 via receiver 610). In some examples, the control message component 810 may pass information from the control message 801 as control message information 811 (e.g., joint control message information) to one or more other components of the device 805. For example, the control message component 811 may electrically send the information 811 received from the base station (or from a receiver that received the control message 801 from the base station) to the frequency information component 815, the bit quantity component 840, the adjustment factor component 825, or any combination thereof among other examples of components in the device 805. The information 811 may include the data included or indicated by the control message.

The frequency information component 815 may determine first frequency information for the downlink message and second frequency information for the uplink message based on the scheduling information and a comparison between a first bitfield size associated with resource allocation for a first bandwidth part associated with the downlink message and a second bitfield size associated with resource allocation for a second bandwidth part associated with the uplink message. For example, the frequency information component 815 may receive information 811 from the control message component 810. The frequency information component 810 may use the information 811 to determine the first frequency information, second frequency information, or both. In some examples, the frequency information component 815 may perform the comparison. In some examples, the frequency information component 815 may determine the first frequency information for the downlink message from a set of bits of the scheduling information based on a result of the comparison. The frequency information component 815 may pass the results of such determinations on to other components in the device 805. For example, the frequency information component 815 may transmit frequency information 816 (e.g., the frequency information component 815 may electrically send the frequency information 816 to the adjustment factor component 825, the first allocation component 830, the second allocation component 835, the bit quantity component 840, the communications component 820, or any combination thereof). For example, the frequency information 816 may include an indication of the first frequency information or the second frequency information.

In some examples, the frequency information component 815 may determine the first frequency information from the set of bits is based on the first size being greater than the second size. In some examples, the frequency information component 815 may determine the first frequency information from the set of bits is based on the first size being smaller than the second size.

In some examples, the frequency information component 815 may determine the second frequency information for the uplink message from a set of bits of the scheduling information based on a result of the comparison. In some examples, the frequency information component 815 may determine the second frequency information from the set of bits is based on the second size being greater than the first size. In some examples, the frequency information component 815 may determine the second frequency information from the set of bits is based on the second size being smaller than the first size.

The communications component 820 may communicate the uplink message and the downlink message with the base station according to the first frequency information and the second frequency information. In some examples, the communications component 820 may communicate the uplink message and the downlink message via a single carrier. In some examples, the communications component 820 may communicate messages 821 with the base station (or a transmitter that communicates the messages 821 with the base station). For example, the communications component 820 may transmit an uplink message or receive a downlink message according to the frequency information 816.

The adjustment factor component 825 may determine a scaling factor based on a first size of the first bandwidth part associated with the downlink message and a second size of the second bandwidth part associated with the uplink message. For example, the adjustment factor 825 may receive information 811 from the control message component 810 (in addition or alternative to frequency information 816) and determine the scaling factor based on the sizes. The adjustment factor 825 may transmit adjustment parameters 826 (e.g., the scaling factor, one or more adjustment factors, and the like) to the frequency information component 815. The frequency information component 815 may receive the adjustment parameters 826 and determine the second frequency information for the uplink message based on the first frequency information and the scaling factor. In some examples, the frequency information component 815 may determine the first frequency information for the downlink message based on the second frequency information and the scaling factor.

In some examples, the adjustment factor component 825 may determine one or more adjustment factors based on the second subset of bits. In some examples, the adjustment factor component 825 may select at least one of the one or more adjustment factors from a set of configured adjustment factors based on the second subset of bits.

The first allocation component 830 may determine a first resource allocation for one of the uplink message or the downlink message based on the set of bits. For example, the first allocation component 830 may receive frequency information 816, information 811, or both from the frequency information component 815 or the control message component 810. The first allocation component 830 may process the received information to determine the first resource allocation. In some examples, the first allocation component 830 may determine a first resource allocation for one of the uplink message or the downlink message based on a first subset of bits of the scheduling information. In some cases, the first resource assignment type and the second resource assignment type are a same resource assignment type. In some cases, the first resource assignment type and the second resource assignment type are different. In some examples, the first allocation component 830 may indicate the first resource allocation 831 to the communications component 820 (e.g., the first allocation component 830 may transmit the first resource allocation 831 indicating the resource allocation for later transmission via messages 821).

The second allocation component 835 may determine a second resource allocation for the other of the uplink message or the downlink message based on a subset of the set of bits. For example, the second allocation component 835 may receive frequency information 816, information 811, or both from the frequency information component 815 or the control message component 810. The second allocation component 830 may process the received information to determine the second resource allocation. In some examples, the second allocation component 835 may determine a second resource allocation for the other of the uplink message or the downlink message based on a second subset of bits of the scheduling information. In some examples, the second allocation component 835 may determine the second resource allocation based on the first resource allocation and the one or more adjustment factors. In some examples, the second allocation component 835 may indicate the second resource allocation 836 to the communications component 820 (e.g., the second allocation component 835 may transmit the second resource allocation 836 indicating the second resource allocation for later transmission via messages 821).

The bit quantity component 840 may determine a quantity of most significant bits or a quantity of least significant bits based on a first size of the first bandwidth part associated with the downlink message, a second size of the second bandwidth part associated with the uplink message, a first resource assignment type for the downlink message, and a second resource assignment type for the uplink message, where the subset of the set of bits includes the quantity of the most significant bits or the quantity of the least significant bits.

In some examples, the bit quantity component 840 may determine a quantity of most significant bits or a quantity of least significant bits included in the first subset of bits based on a first size of the first bandwidth part associated with the downlink message and a second size of the second bandwidth part associated with the uplink message.

In some examples, the bit quantity component 840 may receive frequency information 816, information 811, or both from the frequency information component 815 and the control message component 810, respectively. The bit quantity component 840 may determine the various quantities of bits based on the receiving. For example, the bit quantity component 840 may process the received information to determine the quantity of MSBs and LSBs based on the frequency information 816 or the information 811 indicating the sizes of the bandwidth parts. The bit quantity component 840 may forward indication 841 to the frequency information component 815 (in addition or alternative to other components), for example, indicating the determines quantity of MSBs or LSBs.

Figure 9:
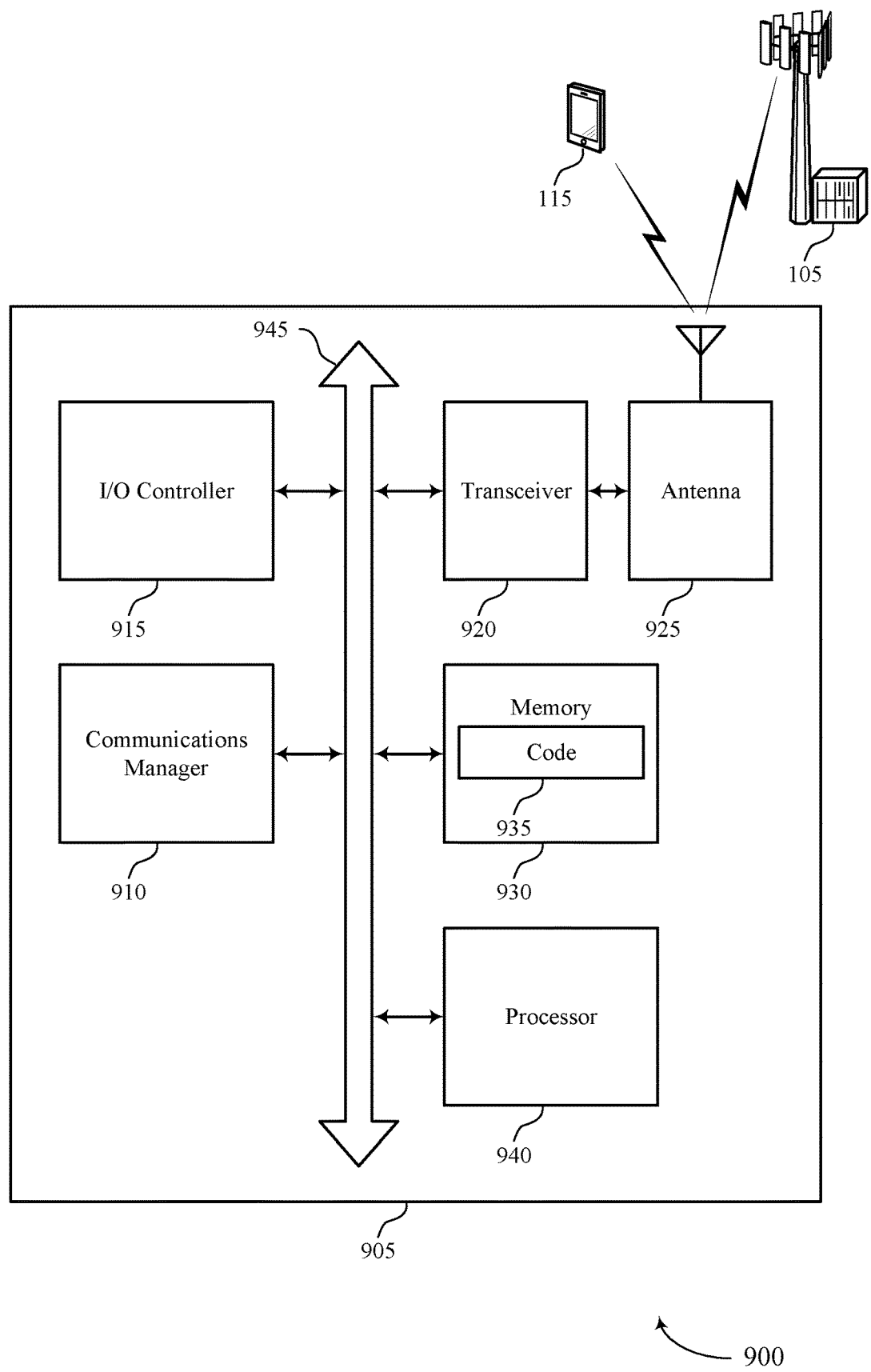
FIG. 9 shows a diagram of a system including a device that supports joint shared channel frequency allocation in downlink control information in accordance with aspects of the present disclosure.

FIG. 9 shows a diagram of a system 900 including a device 905 that supports joint shared channel frequency allocation in downlink control information in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a control message that includes scheduling information for a downlink message to be received by the UE and an uplink message to be transmitted by the UE, determine first frequency information for the downlink message and second frequency information for the uplink message based on the scheduling information and a comparison between a first bitfield size associated with resource allocation for a first bandwidth part associated with the downlink message and a second bitfield size associated with resource allocation for a second bandwidth part associated with the uplink message, and communicate the uplink message and the downlink message with the base station according to the first frequency information and the second frequency information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting joint shared channel frequency allocation in downlink control information).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
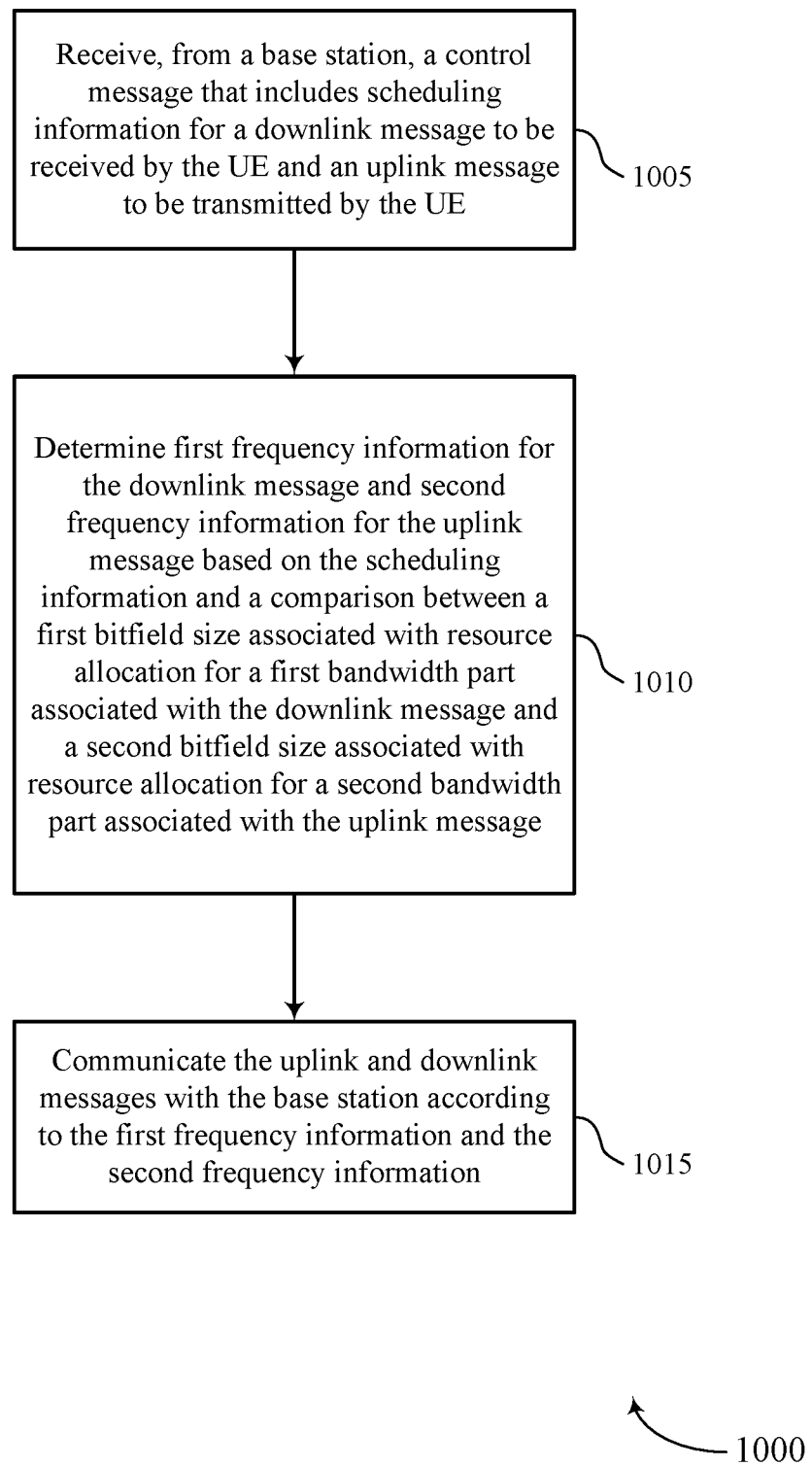
FIGS. 10 and 11 show flowcharts illustrating methods that support joint shared channel frequency allocation in downlink control information in accordance with aspects of the present disclosure.

FIG. 10 shows a flowchart illustrating a method 1000 that supports joint shared channel frequency allocation in downlink control information in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1005, the UE may receive, from a base station, a control message that includes scheduling information for a downlink message to be received by the UE and an uplink message to be transmitted by the UE. For example, the UE may identify time-frequency resources of a control channel, monitor the channel for the control message (e.g., a joint control message), and demodulate and/or decode transmissions received via the channel. The operations of 1005 may be performed according to the methods described herein. In some examples, aspects of the operations of 1005 may be performed by a control message component as described with reference to FIGS. 6 through 9.

At 1010, the UE may determine first frequency information for the downlink message and second frequency information for the uplink message based on the scheduling information and a comparison between a first bitfield size associated with resource allocation for a first bandwidth part associated with the downlink message and a second bitfield size associated with resource allocation for a second bandwidth part associated with the uplink message. The operations of 1010 may be performed according to the methods described herein. In some examples, aspects of the operations of 1010 may be performed by a frequency information component as described with reference to FIGS. 6 through 9.

At 1015, the UE may communicate the uplink message and the downlink message with the base station according to the first frequency information and the second frequency information. For example, the UE may transmit the uplink message to the base station over a PUSCH and receive the downlink message from the base station over a PDSCH. The operations of 1015 may be performed according to the methods described herein. In some examples, aspects of the operations of 1015 may be performed by a communications component as described with reference to FIGS. 6 through 9.

Figure 11:
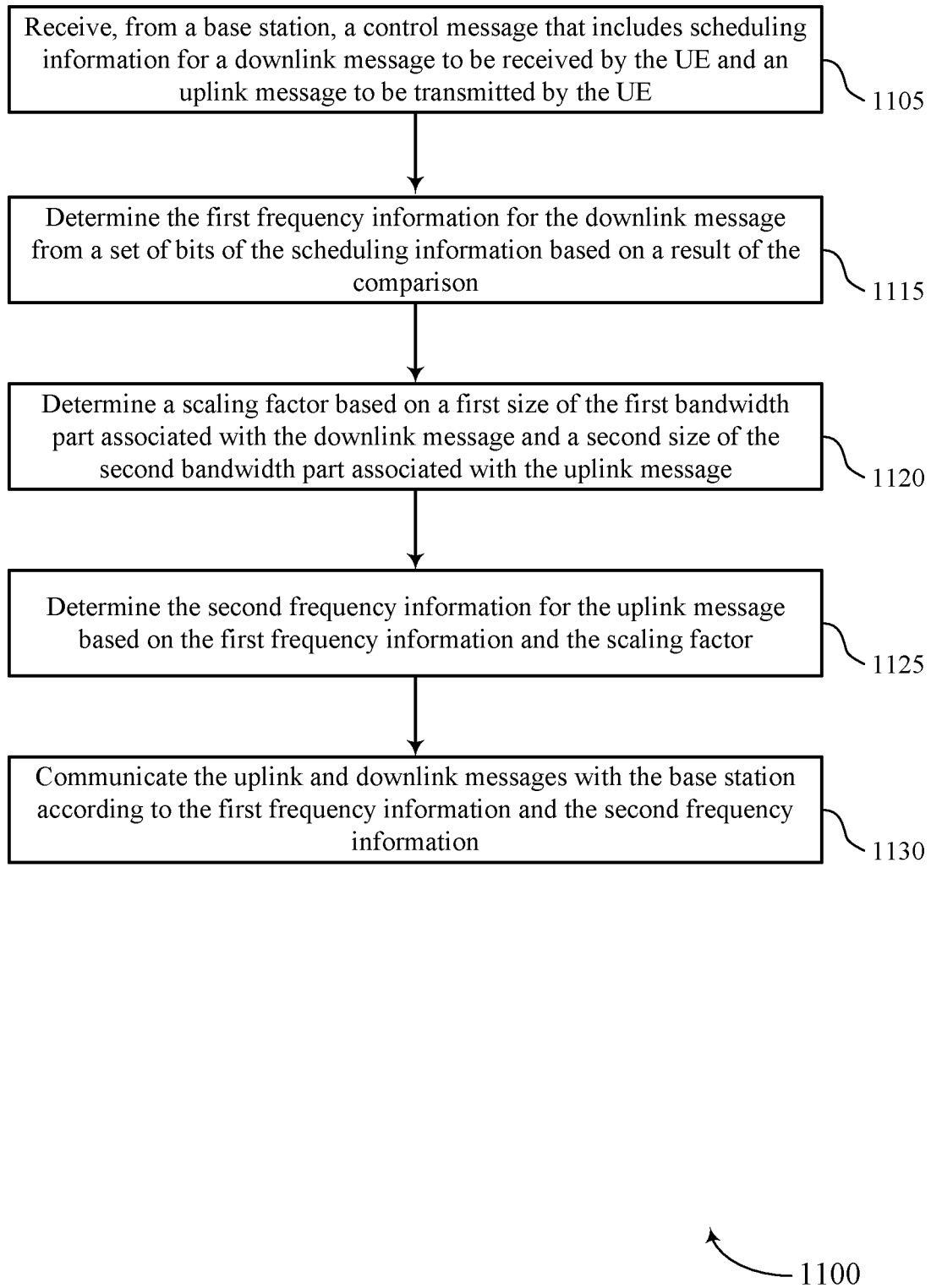

FIG. 11 shows a flowchart illustrating a method 1100 that supports joint shared channel frequency allocation in downlink control information in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1105, the UE may receive, from a base station, a control message that includes scheduling information for a downlink message to be received by the UE and an uplink message to be transmitted by the UE. For example, the UE may identify time-frequency resources of a control channel, monitor the channel for the control message, and demodulate and/or decode transmissions received via the channel. The operations of 1105 may be performed according to the methods described herein. In some examples, aspects of the operations of 1105 may be performed by a control message component as described with reference to FIGS. 6 through 9.

At 1110, the UE may determine the first frequency information for the downlink message from a set of bits of the scheduling information based on a result of the comparison. For example, the UE may receive a FDRA including the set of bits as part of a resource allocation for the downlink message. The operations of 1110 may be performed according to the methods described herein. In some examples, aspects of the operations of 1110 may be performed by a frequency information component as described with reference to FIGS. 6 through 9.

At 1115, the UE may determine a scaling factor based on a first size of the first bandwidth part associated with the downlink message and a second size of the second bandwidth part associated with the uplink message. For example, the UE may use one or more equations to calculate the scaling factor as described herein. The operations of 1115 may be performed according to the methods described herein. In some examples, aspects of the operations of 1115 may be performed by an adjustment factor component as described with reference to FIGS. 6 through 9.

At 1120, the UE may determine the second frequency information for the uplink message based on the first frequency information and the scaling factor. For example, the UE may scale one or more parameters of the first frequency information as described herein. The operations of 1120 may be performed according to the methods described herein. In some examples, aspects of the operations of 1120 may be performed by a frequency information component as described with reference to FIGS. 6 through 9.

At 1125, the UE may communicate the uplink message and the downlink message with the base station according to the first frequency information and the second frequency information. For example, the UE may transmit the uplink message to the base station over a PUSCH and receive the downlink message from the base station over a PDSCH. The operations of 1125 may be performed according to the methods described herein. In some examples, aspects of the operations of 1125 may be performed by a communications component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a control message that comprises scheduling information for a downlink message to be received by the UE and an uplink message to be transmitted by the UE; determining first frequency information for the downlink message and second frequency information for the uplink message based at least in part on the scheduling information and a comparison between a first bitfield size associated with resource allocation for a first bandwidth part associated with the downlink message and a second bitfield size associated with resource allocation for a second bandwidth part associated with the uplink message; and communicating the uplink message and the downlink message with the base station according to the first frequency information and the second frequency information.

Aspect 2: The method of aspect 1, wherein determining the first frequency information and the second frequency information comprises: determining the first frequency information for the downlink message from a set of bits of the scheduling information based at least in part on a result of the comparison; determining a scaling factor based at least in part on a first size of the first bandwidth part associated with the downlink message and a second size of the second bandwidth part associated with the uplink message; and determining the second frequency information for the uplink message based at least in part on the first frequency information and the scaling factor.

Aspect 3: The method of aspect 2, wherein determining the first frequency information from the set of bits is based at least in part on the first size being greater than the second size.

Aspect 4: The method of any of aspects 2 through 3, wherein determining the first frequency information from the set of bits is based at least in part on the first size being smaller than the second size.

Aspect 5: The method of any of aspects 1 through 4, wherein determining the first frequency information and the second frequency information comprises: determining the second frequency information for the uplink message from a set of bits of the scheduling information based at least in part on a result of the comparison; determining a scaling factor based at least in part on a first size of the first bandwidth part associated with the downlink message and a second size of the second bandwidth part associated with the uplink message; and determining the first frequency information for the downlink message based at least in part on the second frequency information and the scaling factor.

Aspect 6: The method of aspect 5, wherein determining the second frequency information from the set of bits is based at least in part on the second size being greater than the first size.

Aspect 7: The method of any of aspects 5 through 6, wherein determining the second frequency information from the set of bits is based at least in part on the second size being smaller than the first size.

Aspect 8: The method of any of aspects 1 through 7, wherein determining the first frequency information and the second frequency information comprises: determining a first resource allocation for one of the uplink message or the downlink message based at least in part on a set of bits of the scheduling information; and determining a second resource allocation for the other of the uplink message or the downlink message based at least in part on a subset of the set of bits.

Aspect 9: The method of aspect 8, further comprising: determining a quantity of most significant bits or a quantity of least significant bits based at least in part on a first size of the first bandwidth part associated with the downlink message, a second size of the second bandwidth part associated with the uplink message, a first resource assignment type for the downlink message, and a second resource assignment type for the uplink message, wherein the subset of the set of bits comprises the quantity of the most significant bits or the quantity of the least significant bits.

Aspect 10: The method of aspect 9, wherein the first resource assignment type and the second resource assignment type are a same resource assignment type.

Aspect 11: The method of any of aspects 9 through 10, wherein the first resource assignment type and the second resource assignment type are different.

Aspect 12: The method of any of aspects 1 through 11, wherein determining the first frequency information and the second frequency information comprises: determining a first resource allocation for one of the uplink message or the downlink message based at least in part on a first subset of bits of the scheduling information; and determining a second resource allocation for the other of the uplink message or the downlink message based at least in part on a second subset of bits of the scheduling information.

Aspect 13: The method of aspect 12, further comprising: determining a quantity of most significant bits or a quantity of least significant bits included in the first subset of bits based at least in part on a first size of the first bandwidth part associated with the downlink message and a second size of the second bandwidth part associated with the uplink message.

Aspect 14: The method of aspect 13, wherein determining the second resource allocation comprises: determining one or more adjustment factors based at least in part on the second subset bits; and determining the second resource allocation based at least in part on the first resource allocation and the one or more adjustment factors.

Aspect 15: The method of aspect 14, wherein determining the one or more adjustment factors comprises: selecting at least one of the one or more adjustment factors from a plurality of configured adjustment factors based at least in part on the second subset of the set of bits.

Aspect 16: The method of any of aspects 1 through 15, wherein communicating the uplink message and the downlink message with the base station according to the first frequency information and the second frequency information comprises: communicating the uplink message and the downlink message via a single carrier.

Aspect 17: An apparatus for wireless communications at a UE, comprising a processor; memory coupled with the processor; and instructions stored in the memory and executable by the processor to cause the apparatus to perform a method of any of aspects 1 through 16.

Aspect 18: An apparatus for wireless communications at a UE, comprising at least one means for performing a method of any of aspects 1 through 16.

Aspect 19: A non-transitory computer-readable medium storing code for wireless communications at a UE, the code comprising instructions executable by a processor to perform a method of any of aspects 1 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a network device, a joint downlink control information (DCI) message that comprises scheduling information for a downlink message to be received by the UE and an uplink message to be transmitted by the UE;
determining first frequency information for the downlink message and second frequency information for the uplink message based at least in part on the scheduling information and a comparison between a first bitfield size associated with a first bandwidth part associated with the downlink message and a second bitfield size associated with a second bandwidth part associated with the uplink message, wherein the first bitfield size is based at least in part on a size of the first bandwidth part and the second bitfield size is based at least in part on a size of the second bandwidth part; and
communicating the uplink message and the downlink message with the network device according to the first frequency information and the second frequency information.

2. The method of claim 1, wherein determining the first frequency information and the second frequency information comprises:
determining the first frequency information for the downlink message from a set of bits of the scheduling information based at least in part on a result of the comparison;
determining a scaling factor based at least in part on a first size of the first bandwidth part associated with the downlink message and a second size of the second bandwidth part associated with the uplink message; and
determining the second frequency information for the uplink message based at least in part on the first frequency information and the scaling factor.

3. The method of claim 2, wherein:
determining the first frequency information from the set of bits is based at least in part on the first size being greater than the second size.

4. The method of claim 2, wherein:
determining the first frequency information from the set of bits is based at least in part on the first size being smaller than the second size.

5. The method of claim 1, wherein determining the first frequency information and the second frequency information comprises:
determining the second frequency information for the uplink message from a set of bits of the scheduling information based at least in part on a result of the comparison;
determining a scaling factor based at least in part on a first size of the first bandwidth part associated with the downlink message and a second size of the second bandwidth part associated with the uplink message; and
determining the first frequency information for the downlink message based at least in part on the second frequency information and the scaling factor.

6. The method of claim 5, wherein:
determining the second frequency information from the set of bits is based at least in part on the second size being greater than the first size.

7. The method of claim 5, wherein:
determining the second frequency information from the set of bits is based at least in part on the second size being smaller than the first size.

8. The method of claim 1, wherein determining the first frequency information and the second frequency information comprises:

determining a first resource allocation for one of the uplink message or the downlink message based at least in part on a set of bits of the scheduling information; and determining a second resource allocation for the other of the uplink message or the downlink message based at least in part on a subset of the set of bits.

9. The method of claim 8, further comprising:
determining a quantity of most significant bits or a quantity of least significant bits based at least in part on a first size of the first bandwidth part associated with the downlink message, a second size of the second bandwidth part associated with the uplink message, a first resource assignment type for the downlink message, and a second resource assignment type for the uplink message, wherein the subset of the set of bits comprises the quantity of the most significant bits or the quantity of the least significant bits.

10. The method of claim 9, wherein the first resource assignment type and the second resource assignment type are a same resource assignment type.

11. The method of claim 9, wherein the first resource assignment type and the second resource assignment type are different.

12. The method of claim 1, wherein determining the first frequency information and the second frequency information comprises:
determining a first resource allocation for one of the uplink message or the downlink message based at least in part on a first subset of bits of the scheduling information; and
determining a second resource allocation for the other of the uplink message or the downlink message based at least in part on a second subset of bits of the scheduling information.

13. The method of claim 12, further comprising:
determining a quantity of most significant bits or a quantity of least significant bits included in the first subset of bits based at least in part on a first size of the first bandwidth part associated with the downlink message and a second size of the second bandwidth part associated with the uplink message.

14. The method of claim 13, wherein determining the second resource allocation comprises:
determining one or more adjustment factors based at least in part on the second subset of bits; and
determining the second resource allocation based at least in part on the first resource allocation and the one or more adjustment factors.

15. The method of claim 14, wherein determining the one or more adjustment factors comprises:
selecting at least one of the one or more adjustment factors from a plurality of configured adjustment factors based at least in part on the second subset of bits.

16. The method of claim 1, wherein communicating the uplink message and the downlink message with the network device according to the first frequency information and the second frequency information comprises:
communicating the uplink message and the downlink message via a single carrier.

17. An apparatus for wireless communications at a user equipment (UE), comprising:
a processor,
memory coupled with the processor; and
instructions stored in the memory and executable by the processor to cause the apparatus to:

receive, from a network device, a joint downlink control information (DCI) message that comprises scheduling information for a downlink message to be received by the UE and an uplink message to be transmitted by the UE;
determine first frequency information for the downlink message and second frequency information for the uplink message based at least in part on the scheduling information and a comparison between a first bitfield size associated with a first bandwidth part associated with the downlink message and a second bitfield size associated with a second bandwidth part associated with the uplink message, wherein the first bitfield size is based at least in part on a size of the first bandwidth part and the second bitfield size is based at least in part on a size of the second bandwidth part; and
communicate the uplink message and the downlink message with the network device according to the first frequency information and the second frequency information.

18. The apparatus of claim 17, wherein the instructions to determine the first frequency information and the second frequency information are executable by the processor to cause the apparatus to:
determine the first frequency information for the downlink message from a set of bits of the scheduling information based at least in part on a result of the comparison;
determine a scaling factor based at least in part on a first size of the first bandwidth part associated with the downlink message and a second size of the second bandwidth part associated with the uplink message; and
determine the second frequency information for the uplink message based at least in part on the first frequency information and the scaling factor.

19. The apparatus of claim 18, wherein determining the first frequency information from the set of bits is based at least in part on the first size being greater than the second size.

20. The apparatus of claim 18, wherein determining the first frequency information from the set of bits is based at least in part on the first size being smaller than the second size.

21. The apparatus of claim 17, wherein the instructions to determine the first frequency information and the second frequency information are executable by the processor to cause the apparatus to:
determine the second frequency information for the uplink message from a set of bits of the scheduling information based at least in part on a result of the comparison;
determine a scaling factor based at least in part on a first size of the first bandwidth part associated with the downlink message and a second size of the second bandwidth part associated with the uplink message; and
determine the first frequency information for the downlink message based at least in part on the second frequency information and the scaling factor.

22. The apparatus of claim 21, wherein determining the second frequency information from the set of bits is based at least in part on the second size being greater than the first size.

23. The apparatus of claim 21, wherein determining the second frequency information from the set of bits is based at least in part on the second size being smaller than the first size.

24. The apparatus of claim 17, wherein the instructions to determine the first frequency information and the second frequency information are executable by the processor to cause the apparatus to:
- determine a first resource allocation for one of the uplink message or the downlink message based at least in part on a set of bits of the scheduling information; and
- determine a second resource allocation for the other of the uplink message or the downlink message based at least in part on a subset of the set of bits.

25. The apparatus of claim 24, wherein the instructions are further executable by the processor to cause the apparatus to:
- determine a quantity of most significant bits or a quantity of least significant bits based at least in part on a first size of the first bandwidth part associated with the downlink message, a second size of the second bandwidth part associated with the uplink message, a first resource assignment type for the downlink message, and a second resource assignment type for the uplink message, wherein the subset of the set of bits comprises the quantity of the most significant bits or the quantity of the least significant bits.

26. The apparatus of claim 25, wherein the first resource assignment type and the second resource assignment type are a same resource assignment type.

27. The apparatus of claim 25, wherein the first resource assignment type and the second resource assignment type are different.

28. The apparatus of claim 17, wherein the instructions to determine the first frequency information and the second frequency information are executable by the processor to cause the apparatus to:
- determine a first resource allocation for one of the uplink message or the downlink message based at least in part on a first subset of bits of the scheduling information; and
- determine a second resource allocation for the other of the uplink message or the downlink message based at least in part on a second subset of bits of the scheduling information.

29. The apparatus of claim 28, wherein the instructions are further executable by the processor to cause the apparatus to:
- determine a quantity of most significant bits or a quantity of least significant bits included in the first subset of bits based at least in part on a first size of the first bandwidth part associated with the downlink message and a second size of the second bandwidth part associated with the uplink message.

30. The apparatus of claim 29, wherein the instructions to determine the second resource allocation are executable by the processor to cause the apparatus to:
- determine one or more adjustment factors based at least in part on the second subset of bits; and
- determine the second resource allocation based at least in part on the first resource allocation and the one or more adjustment factors.

31. The apparatus of claim 30, wherein the instructions to determine the one or more adjustment factors are executable by the processor to cause the apparatus to:
- select at least one of the one or more adjustment factors from a plurality of configured adjustment factors based at least in part on the second subset of bits.

32. The apparatus of claim 17, wherein the instructions to communicate the uplink message and the downlink message with the network device according to the first frequency information and the second frequency information are executable by the processor to cause the apparatus to:
- communicate the uplink message and the downlink message via a single carrier.

33. An apparatus for wireless communications at a user equipment (UE), comprising:
- means for receiving, from a network device, a joint downlink control information (DCI) message that comprises scheduling information for a downlink message to be received by the UE and an uplink message to be transmitted by the UE;
- means for determining first frequency information for the downlink message and second frequency information for the uplink message based at least in part on the scheduling information and a comparison between a first bitfield size associated with a first bandwidth part associated with the downlink message and a second bitfield size associated with a second bandwidth part associated with the uplink message, wherein the first bitfield size is based at least in part on a size of the first bandwidth part and the second bitfield size is based at least in part on a size of the second bandwidth part; and
- means for communicating the uplink message and the downlink message with the network device according to the first frequency information and the second frequency information.

34. The apparatus of claim 33, wherein the means for determining the first frequency information and the second frequency information comprises:
- means for determining the first frequency information for the downlink message from a set of bits of the scheduling information based at least in part on a result of the comparison;
- means for determining a scaling factor based at least in part on a first size of the first bandwidth part associated with the downlink message and a second size of the second bandwidth part associated with the uplink message; and
- means for determining the second frequency information for the uplink message based at least in part on the first frequency information and the scaling factor.

35. The apparatus of claim 34, wherein determining the first frequency information from the set of bits is based at least in part on the first size being greater than the second size.

36. The apparatus of claim 34, wherein determining the first frequency information from the set of bits is based at least in part on the first size being smaller than the second size.

37. The apparatus of claim 33, wherein the means for determining the first frequency information and the second frequency information comprises:
- means for determining the second frequency information for the uplink message from a set of bits of the scheduling information based at least in part on a result of the comparison;
- means for determining a scaling factor based at least in part on a first size of the first bandwidth part associated with the downlink message and a second size of the second bandwidth part associated with the uplink message; and
- means for determining the first frequency information for the downlink message based at least in part on the second frequency information and the scaling factor.

38. The apparatus of claim 37, wherein determining the second frequency information from the set of bits is based at least in part on the second size being greater than the first size.

39. The apparatus of claim 37, wherein determining the second frequency information from the set of bits is based at least in part on the second size being smaller than the first size.

40. The apparatus of claim 33, wherein the means for determining the first frequency information and the second frequency information comprises:
means for determining a first resource allocation for one of the uplink message or the downlink message based at least in part on a set of bits of the scheduling information; and
means for determining a second resource allocation for the other of the uplink message or the downlink message based at least in part on a subset of the set of bits.

41. The apparatus of claim 40, further comprising:
means for determining a quantity of most significant bits or a quantity of least significant bits based at least in part on a first size of the first bandwidth part associated with the downlink message, a second size of the second bandwidth part associated with the uplink message, a first resource assignment type for the downlink message, and a second resource assignment type for the uplink message, wherein the subset of the set of bits comprises the quantity of the most significant bits or the quantity of the least significant bits.

42. The apparatus of claim 41, wherein the first resource assignment type and the second resource assignment type are a same resource assignment type.

43. The apparatus of claim 41, wherein the first resource assignment type and the second resource assignment type are different.

44. The apparatus of claim 33, wherein the means for determining the first frequency information and the second frequency information comprises:
means for determining a first resource allocation for one of the uplink message or the downlink message based at least in part on a first subset of bits of the scheduling information; and
means for determining a second resource allocation for the other of the uplink message or the downlink message based at least in part on a second subset of bits of the scheduling information.

45. The apparatus of claim 44, further comprising:
means for determining a quantity of most significant bits or a quantity of least significant bits included in the first subset of bits based at least in part on a first size of the first bandwidth part associated with the downlink message and a second size of the second bandwidth part associated with the uplink message.

46. The apparatus of claim 45, wherein the means for determining the second resource allocation comprises:
means for determining one or more adjustment factors based at least in part on the second subset of bits; and
means for determining the second resource allocation based at least in part on the first resource allocation and the one or more adjustment factors.

47. The apparatus of claim 46, wherein the means for determining the one or more adjustment factors comprises:
means for selecting at least one of the one or more adjustment factors from a plurality of configured adjustment factors based at least in part on the second subset of bits.

48. The apparatus of claim 33, wherein the means for communicating the uplink message and the downlink message with the network device according to the first frequency information and the second frequency information comprises:
means for communicating the uplink message and the downlink message via a single carrier.

49. A non-transitory computer-readable medium storing code for wireless communications at a user equipment (UE), the code comprising instructions executable by a processor to:
receive, from a network device, a joint downlink control information (DCI) message that comprises scheduling information for a downlink message to be received by the UE and an uplink message to be transmitted by the UE;
determine first frequency information for the downlink message and second frequency information for the uplink message based at least in part on the scheduling information and a comparison between a first bitfield size associated with a first bandwidth part associated with the downlink message and a second bitfield size associated with a second bandwidth part associated with the uplink message, wherein the first bitfield size is based at least in part on a size of the first bandwidth part and the second bitfield size is based at least in part on a size of the second bandwidth part; and
communicate the uplink message and the downlink message with the network device according to the first frequency information and the second frequency information.

* * * * *